(12) United States Patent
Martino

(10) Patent No.: US 9,702,340 B2
(45) Date of Patent: *Jul. 11, 2017

(54) PRIME MOVER

(71) Applicant: Dominick Daniel Martino, Levittown, PA (US)

(72) Inventor: Dominick Daniel Martino, Levittown, PA (US)

( * ) Notice: Subject to any disclaimer, the term of this patent is extended or adjusted under 35 U.S.C. 154(b) by 630 days.

This patent is subject to a terminal disclaimer.

(21) Appl. No.: 13/937,783

(22) Filed: Jul. 9, 2013

(65) Prior Publication Data

US 2013/0294886 A1    Nov. 7, 2013

Related U.S. Application Data

(63) Continuation-in-part of application No. 13/141,724, filed as application No. PCT/US2009/069416 on Dec. 23, 2009, now Pat. No. 8,496,429.

(Continued)

(51) Int. Cl.
F03D 3/04    (2006.01)
F03D 3/02    (2006.01)
(Continued)

(52) U.S. Cl.
CPC ............... *F03D 3/02* (2013.01); *F03D 1/04* (2013.01); *F03D 3/0409* (2013.01);
(Continued)

(58) Field of Classification Search
CPC ...... F03D 3/0409; F03D 3/0427; F03D 3/062; F03D 11/04; F05B 2240/13;
(Continued)

(56) References Cited

U.S. PATENT DOCUMENTS 969,587  A  *  9/1910  Williams .................. F03D 1/04
                                          415/208.1
1,368,454 A  *  2/1921  Rebman ................ F03B 17/063
                                          416/85

(Continued)

FOREIGN PATENT DOCUMENTS

EP    1398500    3/2004
GB    2116640    9/1983

(Continued)

OTHER PUBLICATIONS

International Patent Application No. PCT/US2009/069416: International Serach Report and Written Opinion dated Mar. 11, 2010, 10 pages.

*Primary Examiner* — Ninh H Nguyen
(74) *Attorney, Agent, or Firm* — Baker & Hostetler LLP

(57) ABSTRACT

A prime mover that is powered by the energy of a fluid is provided. Such a prime mover may include a first fairing, a second fairing spaced apart from the first fairing to define a gap therebetween and a blade assembly mounted on a shaft that extends between the first and second fairings. The first and second fairings each have a curved peripheral edge for directing a fluid into the gap. When the fluid flows into the gap it contacts the blade assembly to thereby rotate the blade assembly about an axis that is defined by the shaft. The prime mover may be mounted on a cell phone tower and used to generate electricity for powering components of the tower and/or for providing electricity to the power grid.

49 Claims, 35 Drawing Sheets

Related U.S. Application Data

(60) Provisional application No. 61/140,710, filed on Dec. 24, 2008.

(51) Int. Cl.

| | |
|---|---|
| *F03D 7/06* | (2006.01) |
| *F03D 1/04* | (2006.01) |
| *F03D 3/06* | (2006.01) |
| *F03D 13/20* | (2016.01) |

(52) U.S. Cl.
CPC ........... *F03D 3/0427* (2013.01); *F03D 3/065* (2013.01); *F03D 7/06* (2013.01); *F03D 13/20* (2016.05); *F05B 2240/12* (2013.01); *F05B 2240/133* (2013.01); *F05B 2240/912* (2013.01); *F05B 2240/93* (2013.01); *F05B 2250/5011* (2013.01); *Y02E 10/727* (2013.01); *Y02E 10/728* (2013.01); *Y02E 10/74* (2013.01)

(58) Field of Classification Search
CPC .......... F05B 2240/133; F05B 2240/216; F05B 2240/912; F05B 2240/93; F05B 2250/5011

See application file for complete search history.

(56) References Cited

U.S. PATENT DOCUMENTS

| | | | | |
|---|---|---|---|---|
| 3,902,072 | A | * | 8/1975 | Quinn ..................... F03D 3/068 290/55 |
| 3,930,750 | A | * | 1/1976 | Schultz .................. F03D 3/065 416/197 A |
| 3,938,907 | A | * | 2/1976 | Magoveny ............ F03D 3/0409 415/141 |
| 4,162,410 | A | | 7/1979 | Amick |
| 4,191,505 | A | | 3/1980 | Kaufman |
| 4,245,958 | A | * | 1/1981 | Ewers ...................... F03D 7/06 415/907 |
| 5,463,257 | A | * | 10/1995 | Yea ...................... F03D 3/0418 290/44 |
| 5,656,865 | A | | 8/1997 | Evans |
| 5,680,032 | A | * | 10/1997 | Pena ...................... B60K 6/105 290/52 |
| 5,852,331 | A | * | 12/1998 | Giorgini ................... F03D 1/04 290/44 |
| 6,345,957 | B1 | * | 2/2002 | Szpur ..................... F03D 3/065 416/197 A |
| 6,448,668 | B1 | | 9/2002 | Robitaille |
| 6,465,899 | B2 | * | 10/2002 | Roberts ................ F03D 3/0409 290/44 |
| 6,786,697 | B2 | | 9/2004 | O'Connor et al. |
| 6,809,432 | B1 | | 10/2004 | Bilgen |
| 6,849,964 | B2 | | 2/2005 | Becherucci et al. |
| 7,084,520 | B2 | * | 8/2006 | Zambrano ............... F03D 13/20 290/4 R |
| 7,397,144 | B1 | | 7/2008 | Brostmeyer |
| 7,824,060 | B2 | * | 11/2010 | Pelken ..................... F03D 3/02 362/183 |
| 8,496,429 | B2 | | 7/2013 | Martino |
| 8,864,440 | B2 | * | 10/2014 | Sauer, Jr. ................ F03D 3/065 415/4.2 |
| 2007/0020097 | A1 | | 1/2007 | Ursua |
| 2007/0126240 | A1 | * | 6/2007 | Richards ................ F03D 3/002 290/55 |
| 2007/0176431 | A1 | | 8/2007 | Graham |
| 2007/0296219 | A1 | | 12/2007 | Nica |
| 2009/0284018 | A1 | | 11/2009 | Ellis |
| 2011/0175366 | A1 | | 7/2011 | Steinlechner |
| 2012/0014799 | A1 | | 1/2012 | Mewburn-Crook |
| 2012/0139252 | A1 | | 6/2012 | Martino |

FOREIGN PATENT DOCUMENTS

| | | | |
|---|---|---|---|
| WO | WO 97/11272 | 3/1997 | |
| WO | WO 2006/022590 | 3/2006 | |
| WO | WO 2006/089425 | 8/2006 | |
| WO | WO 2008126786 A1 * | 10/2008 | ........... F03B 17/063 |
| WO | WO 2009/047679 | 4/2009 | |

* cited by examiner

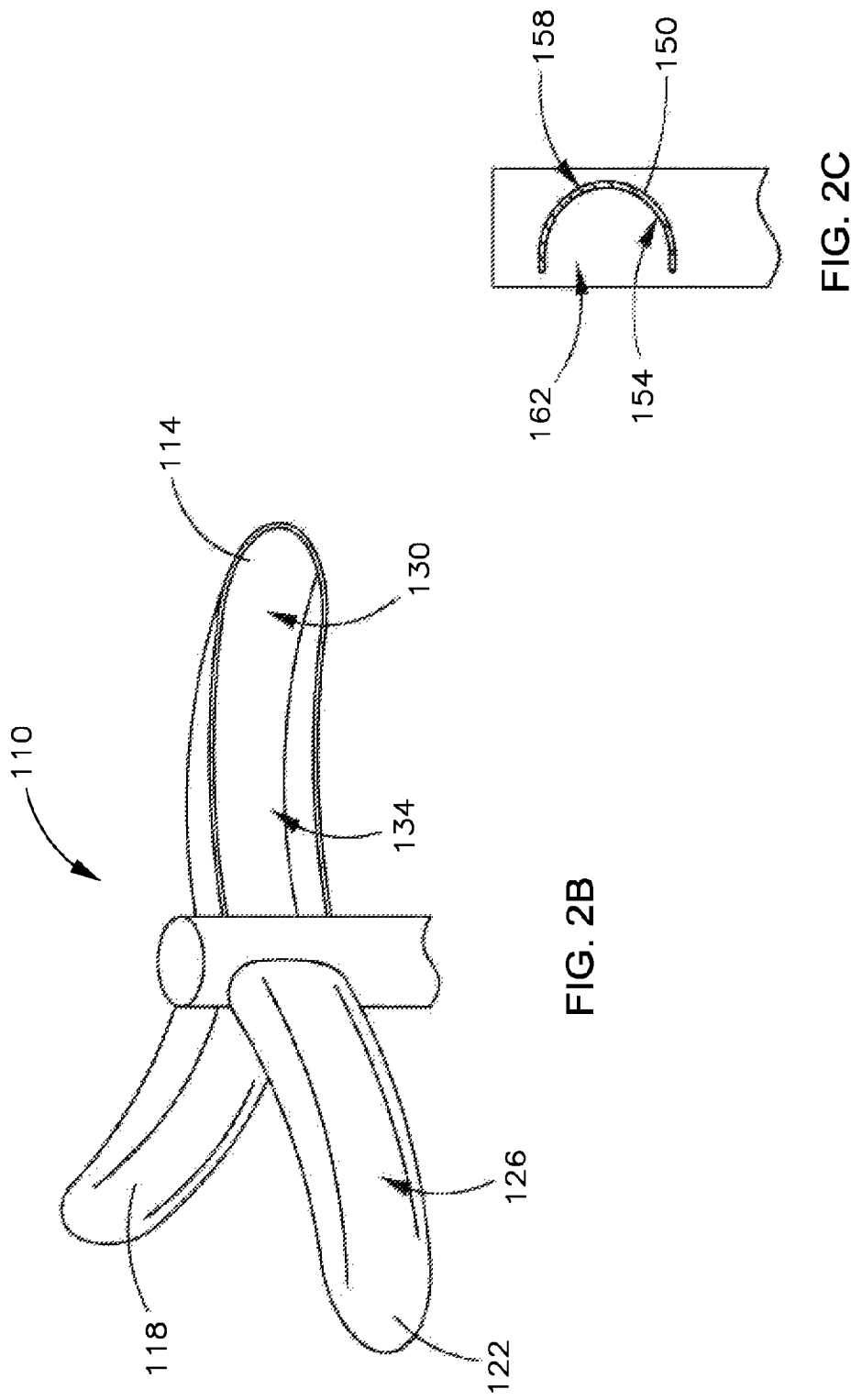

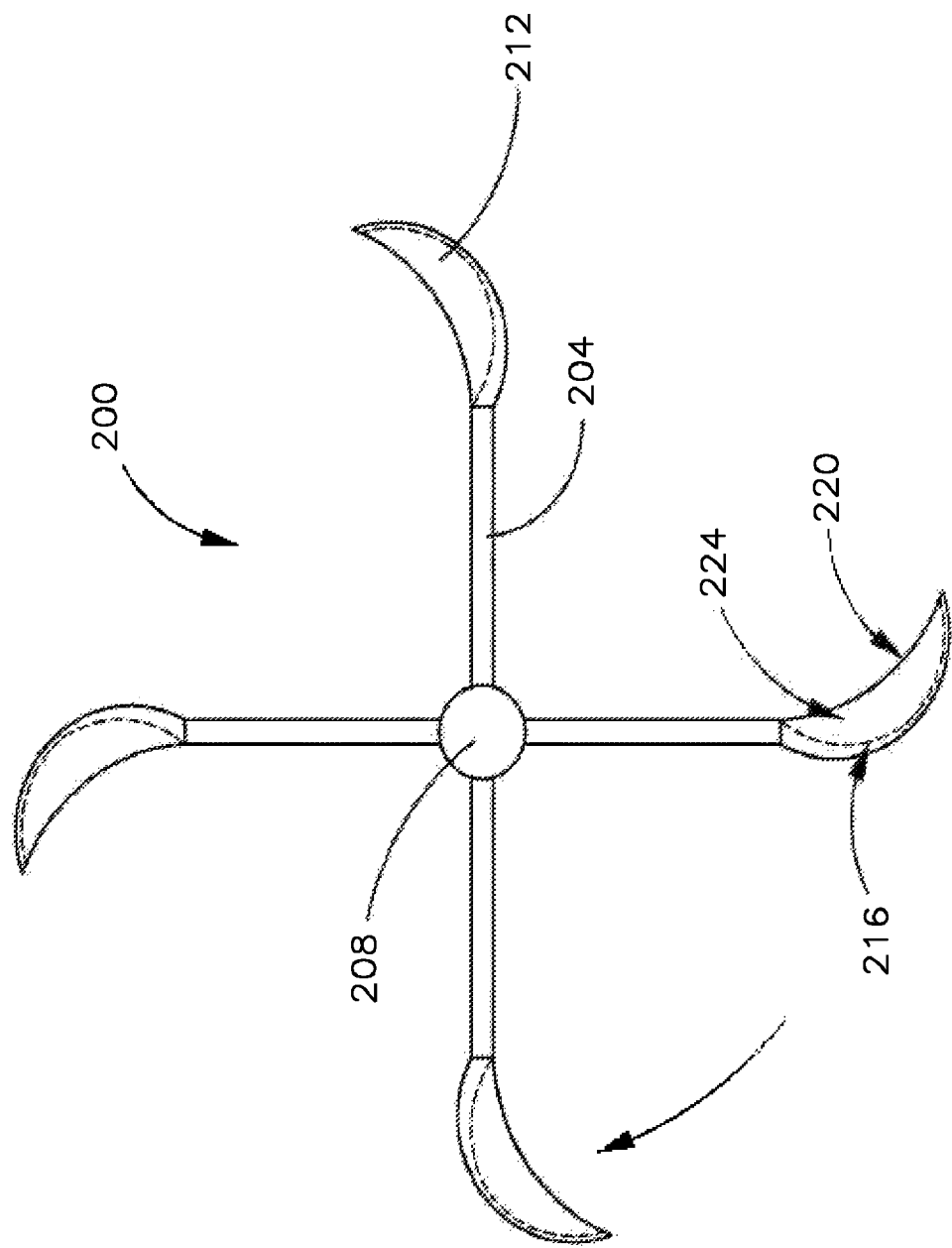

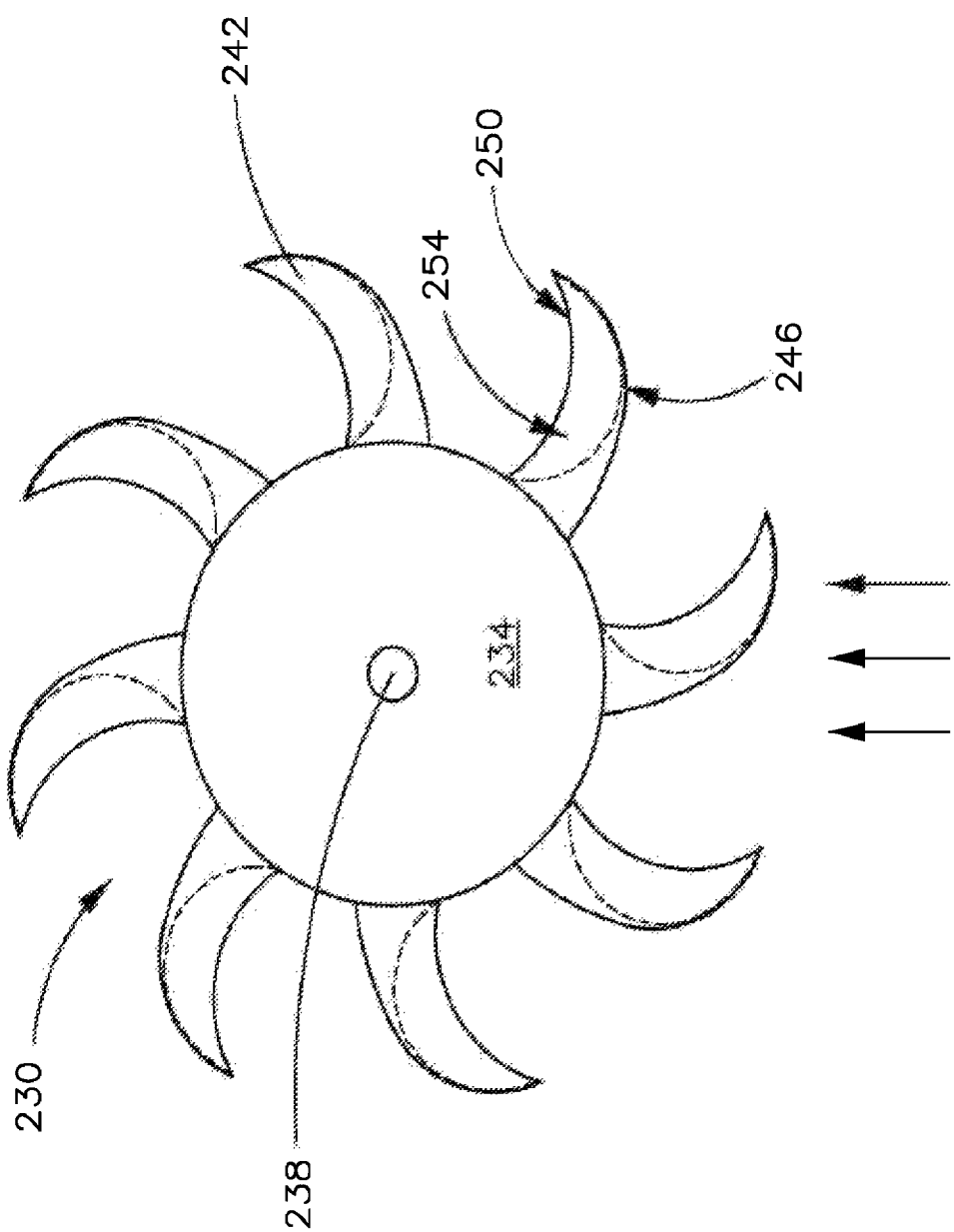

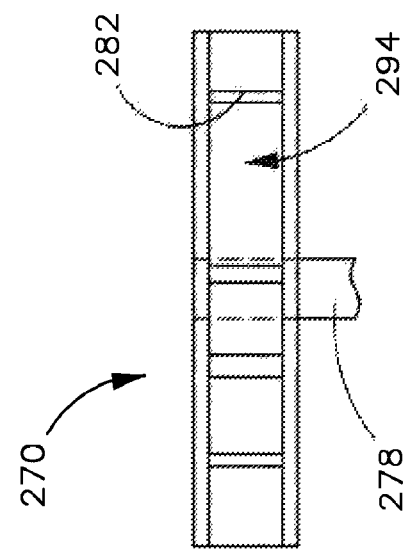
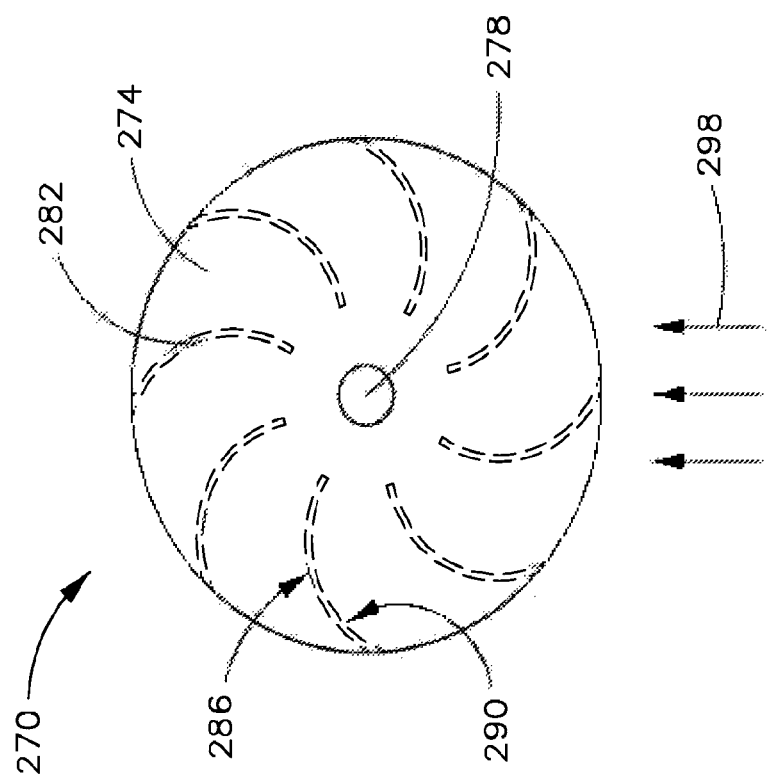
FIG. 5B
FIG. 5A

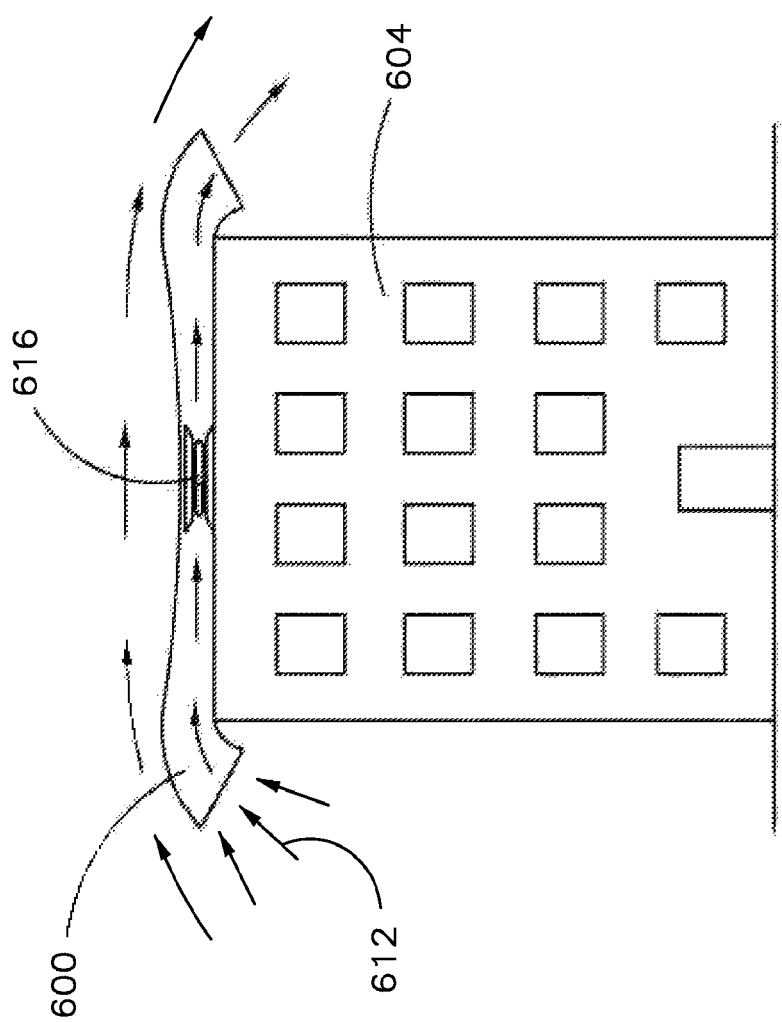

PRIME MOVER

CROSS-REFERENCE TO RELATED APPLICATIONS

This application is a continuation-in-part application of U.S. patent application Ser. No. 13/141,724, filed Aug. 11, 2011, which is the National Stage of International Application No. PCT/US2009/069416, filed Dec. 23, 2009, which claims the benefit of U.S. Provisional Application No. 61/140,710, filed Dec. 24, 2008, the disclosures of which are incorporated herein by reference in their entirety for any and all purposes.

TECHNICAL FIELD

The present invention relates generally to a prime mover and methods of use. More particularly, the invention relates to an apparatus and method for generating power derived from fluid flow.

BACKGROUND

For years, rotating blades have been used for converting wind and/or water energy into other forms of energy needed to accomplish useful work. For example, classic windmills and wind turbines employ propeller surfaces to engage a wind stream and convert the energy in the wind stream into rotation of a horizontal windmill shaft. These classic windmills, however, have many shortcomings. For example, the propellers or blades of classic windmills are typically facing one direction. If the wind is not blowing in the direction of the propellers, the windmill is not working, and wind energy is not being converted into other forms of energy as desired. Furthermore, regardless of whether optimal wind directionality is achieved, horizontal axis windmills cannot exploit high energy, high velocity winds because such winds can overload the moving blades causing damage or failure. It is necessary to shut down conventional horizontal windmills at wind speeds in excess of 35 mph to avoid these problems. Wind energy increases as the cube of velocity; the cessation of blade operation during high-velocity winds represents a serious disadvantage because this is when the most wind energy is available for conversion.

Vertical axis wind turbines are also available. Although vertical axis turbines address many of the shortcomings of horizontal shaft windmills, they have their own inherent problems. For example, some prior art devices change airflow to the blade areas in undesirable ways, such as the device shown in International Publication No. WO 2009/047679. There, fluid is sucked in through a hollow center of the device's fluid deflectors. A large gap is required between the fluid deflectors in order for the device to operate properly. In particular, the device needs the large gap for a favorable vortex formation, to rotate the blades. Accordingly, such a device may be inefficient, and have a large undesirable height.

Accordingly, an improved prime mover that is efficient and practical is needed.

SUMMARY

A prime mover that is powered by the energy of a fluid is provided. Such a prime mover may include a first fairing, a second fairing spaced apart from the first fairing to define a gap therebetween, and a blade assembly mounted on a shaft that extends between the first and second fairings. A height of at least one of the fairings is at least 15% of the height of the gap that is defined between the fairings. The first and second fairings each have a curved peripheral edge for guiding a fluid into the gap. When the fluid flows into the gap it contacts the blade assembly to thereby rotate the blade assembly about a vertical axis that is defined by the shaft. In some embodiments, the peripheral edge of each fairing transitions into a substantially flat continuous surface.

Electricity may be generated from a prime mover that is mounted on a tower that is configured to transmit signals. The prime mover may include a first fairing and a second fairing spaced apart from the first fairing. A blade assembly may be disposed between the first and second fairings and may be configured to rotate about a vertical axis when the blade assembly is contacted by a fluid. Energy may be generated from the rotating blade assembly and used to drive a generator. The generator, along with other controls, items or devices, may be mounted externally, or incorporated within the fairings, for protection, space saving, or other reasons. The stored energy may then be delivered to a power grid.

BRIEF DESCRIPTION OF THE DRAWINGS

FIG. 2B is an isometric view of another example embodiment of a blade assembly to be used with a prime mover in accordance with the present invention.

FIG. 2C is a cross-section of a blade that forms part of a blade assembly.

FIG. 3B is a top view of another example embodiment of a blade assembly to be used with a prime mover in accordance with the present invention.

FIG. 4 is a top view of another example embodiment of a blade assembly to be used with a prime mover in accordance with the present invention.

FIG. 5A is a top view of another example embodiment of a blade assembly to be used with a prime mover in accordance with the present invention.

FIG. 5B is a side view of the blade assembly shown in FIG. 5A.

FIG. 10A is a schematic depicting a flow guide for guiding higher speed laminar airflow found just off the top edge of a building.

DETAILED DESCRIPTION OF ILLUSTRATIVE EMBODIMENTS

Preferred structures and methods for generating power are described herein. Embodiments of a prime mover that employ this technology are also described. The present invention is not limited to the disclosed configurations and uses of the prime movers, but rather encompasses use of the technology disclosed in any power generation application according to the language of the claims.

Figure 1A:
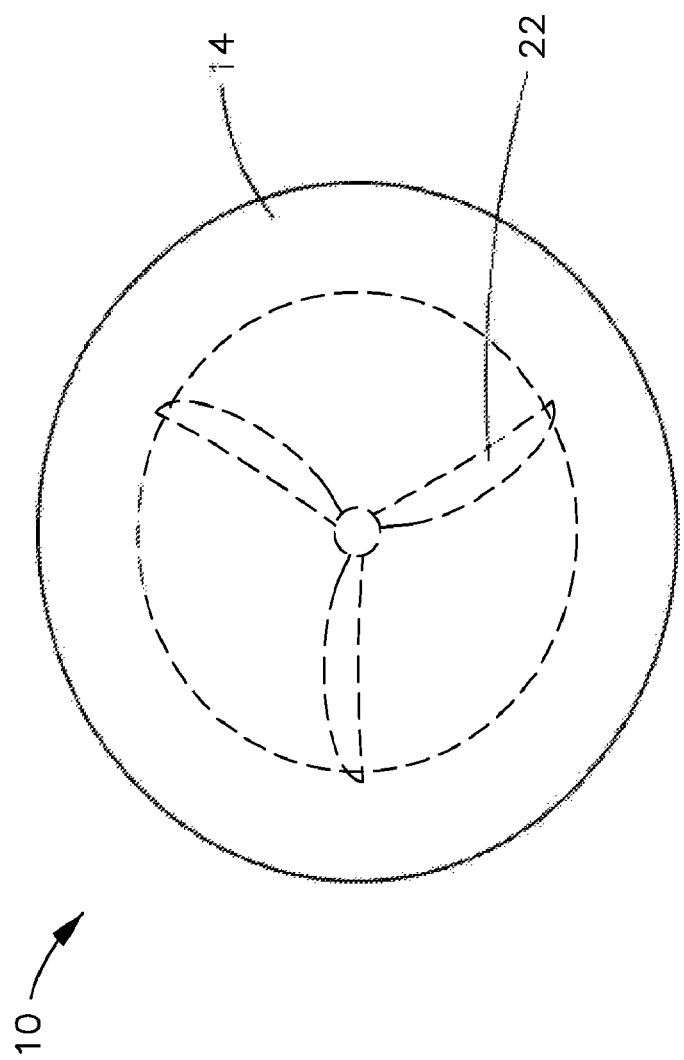
FIG. 1A is a top view of an example embodiment of a prime mover.
Figure 1B:
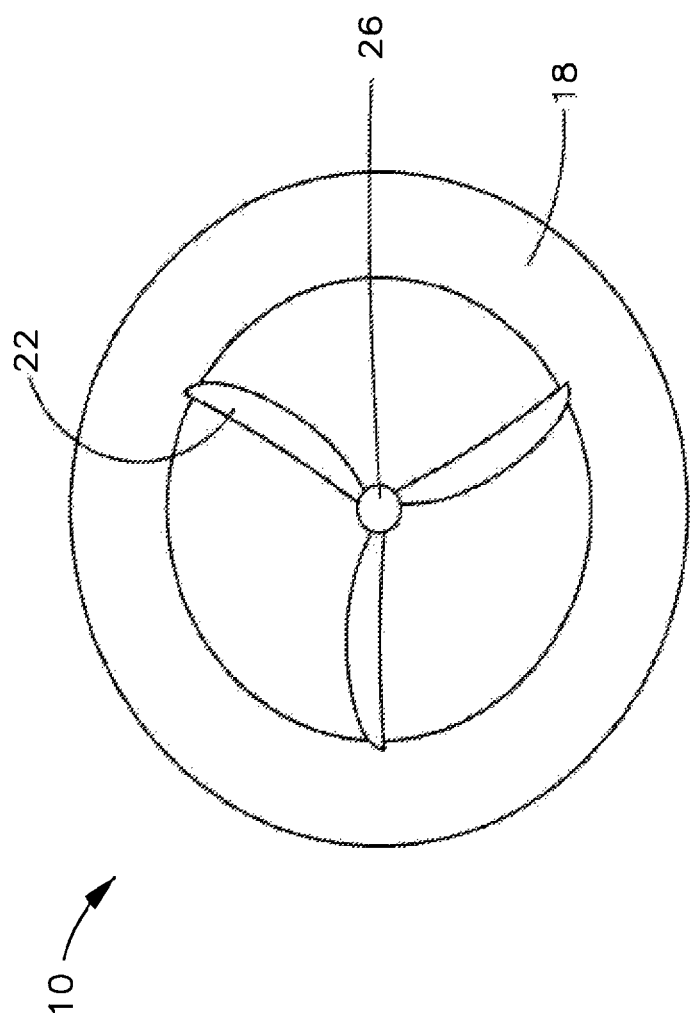
FIG. 1B is a top view of the prime mover shown in FIG. 1A with a top fairing removed for clarity.
Figure 1C:
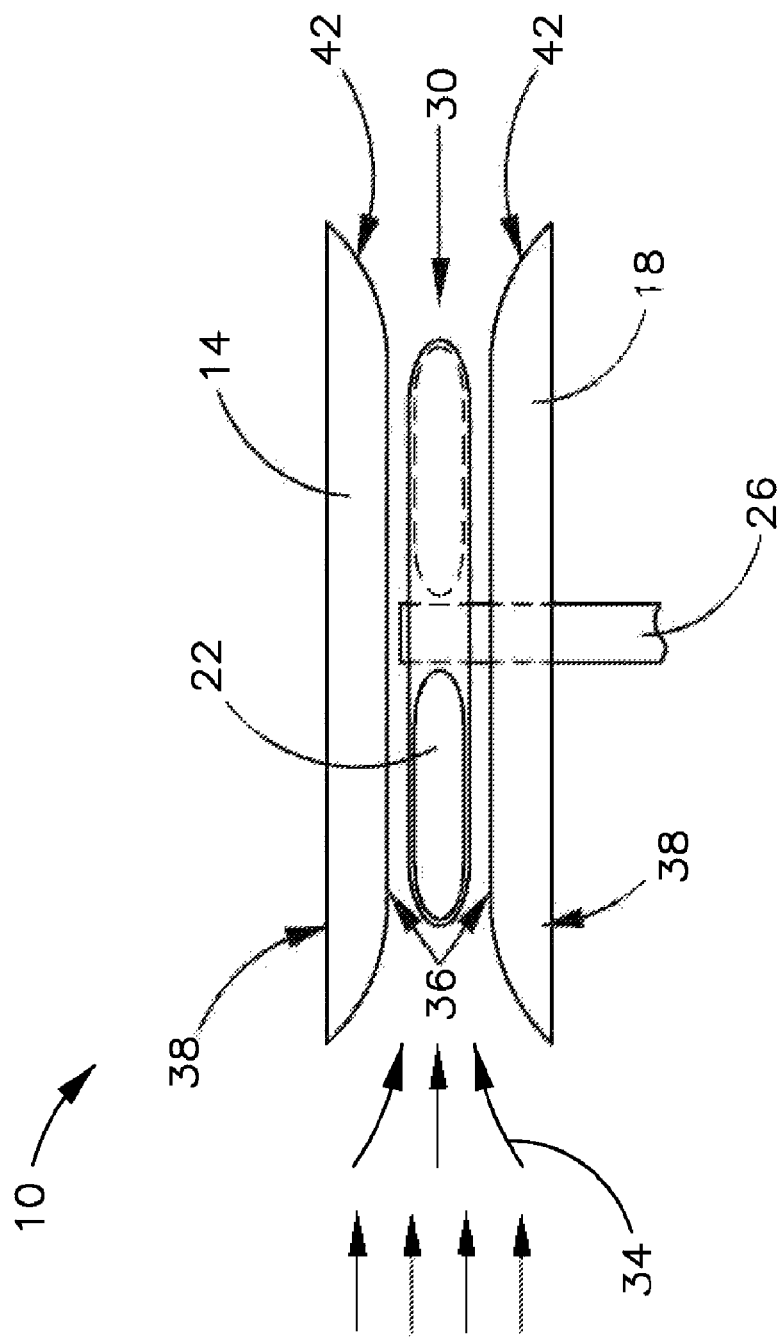
FIG. 1C is a side view of the prime mover shown in FIG. 1A.

FIGS. 1A, 1B and 1C depict an example prime mover. As shown, a prime mover 10 may include a first fairing 14, a second fairing 18, and a blade assembly 22 mounted on a shaft 26. As known by those skilled in the art, the shaft 26 turned by the blade assembly 22 in turn drives a generator (not shown) that generates electrical power. As shown in FIG. 1C, first fairing 14 is spaced apart from second fairing 18 such that a gap 30 is formed between the two fairings. Gap 30 should be large enough such that blade assembly 22 can freely rotate on shaft 26 between first and second fairings 14 and 18. As shown in FIG. 1C, a fluid 34 may flow between first and second fairings 14 and 18, into gap 30 and may contact blade assembly 22 to thereby rotate blade assembly 22. Fluid 34 may be any fluid, such as air or water, for example. It should be understood that fairings 14 and 18, and blade assembly 22 may be connected together to rotate as a single unit as opposed to the embodiment shown where only blade assembly 22 rotates. It should be further understood that the fairings could act as protective covering, from water, weather, sand, or other contaminants for operational items and equipment contained therein including generators, control systems, and others items known to those skilled in the art necessary for the maintenance, cooling, control, generation of power and/or general operation of the prime mover.

As shown in FIGS. 1A, 1B and 1C, fairings 14 and 18 are each oriented in a horizontal plane and have an internal surface 36, an external surface 38, and a peripheral surface 42. As shown in FIGS. 1A and 1B, fairings 14 and 18 preferably are circular in shape. Furthermore, either fairing 14 or 18 or both preferably has a height that is at least 15% of the height of the gap 30 between the fairings 14 and 18, more preferably at least 20% and even more preferably 30%. The larger heights of the fairings further increase the fluid flow velocity to the blade area. By having fairings that are circular and oriented in a horizontal plane, prime mover 10 may be omni-directional. That is, prime mover 10 may be capable of operating regardless of what direction fluid 34 is flowing. It should be understood, however, that fairings 14 and 18 are not limited to having a circular shape and may have other shapes.

As shown in FIGS. 1A, 1B and 1C, the internal surfaces 36 of fairings 14 and 18 are continuous and each have a diameter that is less than the diameters of their respective external surfaces 38. It should be understood that the term continuous means substantially uninterrupted by holes. The continuous internal surfaces help produce the desired Venturi effect. Additionally, fairings 14 and 18 are positioned such that the internal surface 36 of fairing 14 is opposing internal surface 36 of fairing 18. Because of the difference in diameters between internal surfaces 36 and external surfaces 38, in conjunction with the heights of the internal surfaces 36 and the external surfaces 38, and because of the positioning of fairings 14 and 18 relative to each other, peripheral surfaces 42 will guide fluid 34 toward blade assembly 22 as shown in FIG. 1C. Preferably, peripheral surfaces 42 are Bernoulli shaped, curving inward toward gap 30. That is, peripheral surfaces 42 could have a curve, for example, a circular arc or be parabolic in shape, or peripheral surfaces 42 could be straight. In many cases a semicircular peripheral edge, as depicted in FIG. 1H, is desirable. First the semicircular peripheral edge 307 helps promote vortex action, parallel to the wind, around the fairing 309. This can help draw more fluid flow to the blades 302. Additionally, this shape has an added benefit in that the fairings 309 can act as flotation devices, and can act as protective coverings for operational items and equipment as described previously, for those applications whereby the prime mover floats on the water and is used to power rescue devices or used for other maritime applications. Additionally, fairings 309 may act as storage/protective containers for items known to those skilled in the art as useful for survival and rescue (e.g., radio transmitters, matches, food, and light sources). Anchoring vanes 311 are shown also in FIG. 1I, attached to the bottom of fairing 309, to slow or stop the fairings from turning in the water while the prime mover is floating and generating electricity. By having curved peripheral surfaces 42, flowing fluid 34 will not only be guided toward gap 30 and therefore toward blade assembly 22, but will also increase in speed as it enters gap 30. Therefore, prime mover 10 is capable of operating in an environment where fluid 34 flows at slower speeds and can transform energy at a faster rate at all speeds. It should be understood that the peripheral edge of the fairings does not have to be curved but could also be straight to guide fluid into the blade area.

For example, the power available in the wind is given by the following equation:

Wind Power Equation $$P = \frac{1}{2} C_p \times \rho \times A \times V^3 \quad \text{Equation 1}$$

Where:
P=Power available in the wind measured in watts
Cp=blade efficiency
A=area in square meters swept by the blades
ρ=air density
V=wind velocity.

It is not possible to change the speed at which the wind blows; however, one can increase the speed of the wind that the blades receive. This is done through the use of fairings 14 and 18 that create a type of Venturi effect whereby the cross sectional area of an external fluid flow field is substantially reduced in the gap 30 between the fairings 14 and 18 to thereby substantially increase the velocity between the fairings 14 and 18. The velocity increase of a typical Venturi tube is given by the following equation:

$$A_1 V_1 = A_2 V_2 \quad \text{Equation 2: Venturi tube equation}$$

Where $A_1$ is the area of the fluid flow field entering the Venturi tube and $A_2$ is the cross sectional area of the smallest part of the inside of the tube. $V_1$ is the external fluid flow velocity while $V_2$ is the internal fluid flow velocity.

From the equation it can be seen that as the ratio of the external fluid flow area to the internal fluid flow area increases so does the fluid flow velocity inside the tube. The fairings 14 and 18 operate similarly (but to a lesser degree) except that, unlike the Venturi tube, fluid can enter and be utilized from any azimuth direction. The cross sectional area of the entering fluid flow is traded-off to increase the velocity of the fluid hitting the prime mover blade assembly 22 internally. The fairings 14 and 18 may therefore increase the fluid velocity to the blade assembly 22 such that the lower blade efficiency of vertical axis wind turbines is overcome to utilize their advantages and obtain increased power outputs, and may also allow multiple prime movers to be stacked one on top of another to multiply power and enable implementations on communications towers.

As shown in FIG. 1C, shaft 26 extends at least partially between fairings 14 and 18. As shown in FIGS. 1A, 1B and 1C, shaft 26 and blade assembly 22 which is mounted on shaft 26 are proximate to the center of fairings 14 and 18. It shall be understood that while shaft 26 is shown as extending partially between fairings 14 and 18, it may extend completely between fairings 14 and 18. It should also be understood that the entire prime mover assembly 10 may be oriented in any direction such as a mounting on the side of a building, whereby the bottom of fairing 18 rests flat on the side of a building rather than resting flat on a rooftop.

Figure 1D:
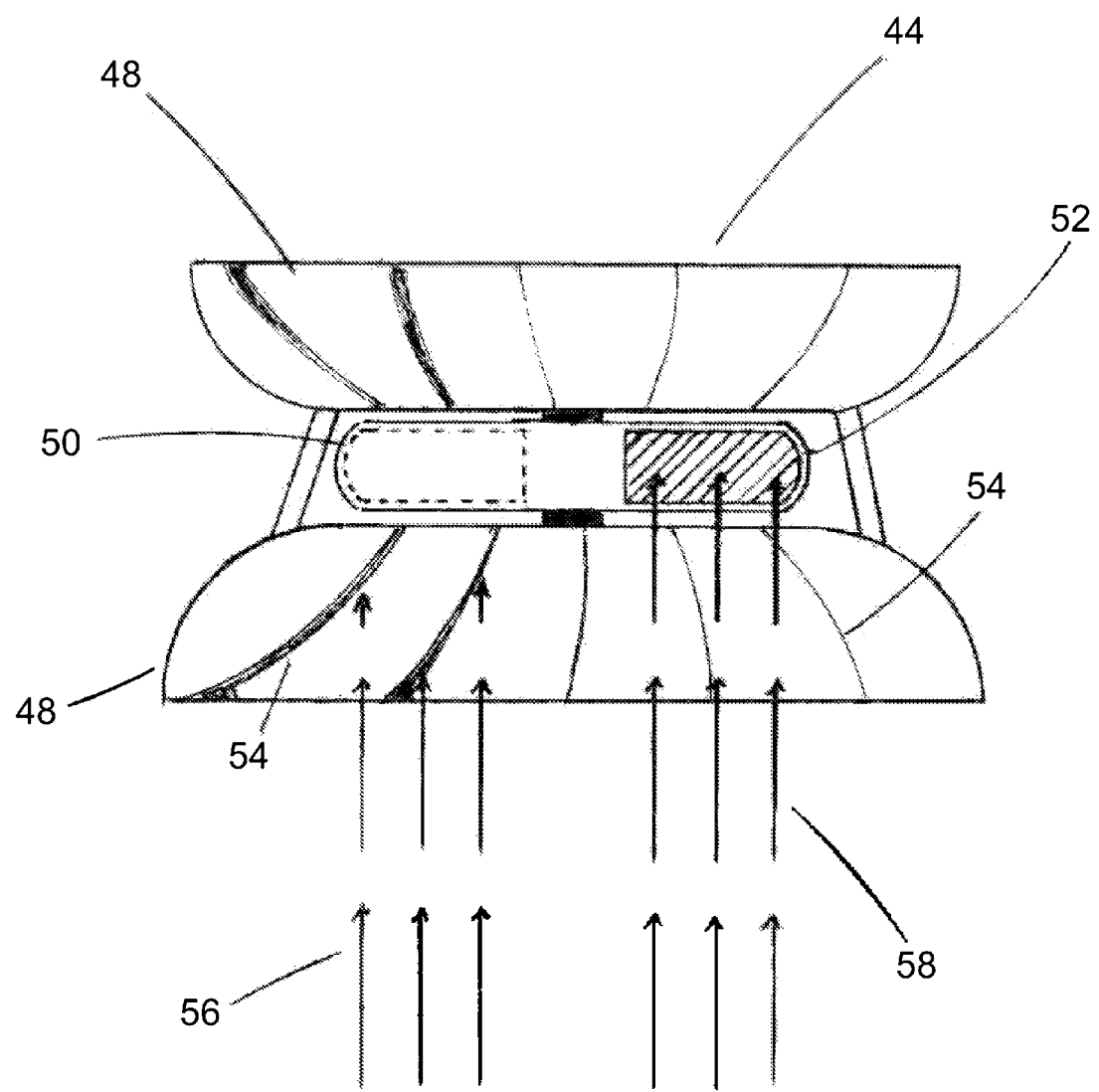
FIG. 1D is a side view of a prime mover with slotted fairings.

FIG. 1D depicts an implementation of a prime mover 44 incorporating slotted fairings 48 whereby some flow components 56 are prevented from impacting return blade 50 by overlapping annular slots 54 that are open to the interior of fairings 48 at the angle from which flow components 56 arrive at fairings 48. Overlapping annular slots 54 are not open to the interior of fairing 48 at the angle from which flow components 58 strike fairings 48 and pass those components, at a higher velocity, to impact blade 52 thereby creating a greater pressure and drag differential between return blade 50 and forward blade 52 to increase the efficiency of the prime mover. The pressure and drag differential created as described above remains constant regardless of which direction the flow components arrive at the prime mover or how often that flow direction changes.

Figure 1E:
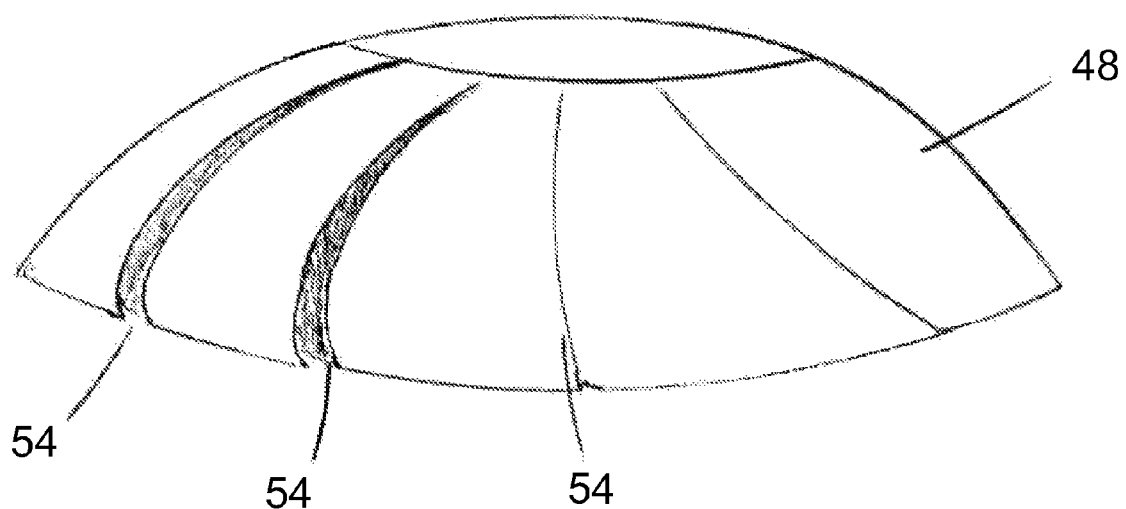
FIG. 1E is a side view of a single slotted fairing.

FIG. 1E depicts one slotted fairing 48 with overlapping annular slots 54. Although overlapping annular slots 54 are shown oriented in a substantially vertical direction and curved it is understood that the orientation could be substantially horizontal, such as along the edge of the fairing 48 furthest from the blade area, to reduce and/or redirect the fluid flow from that point or the stagnation point. Slots 54 could also be straight rather than curved or oriented in a number of other directions.

Figure 1F:
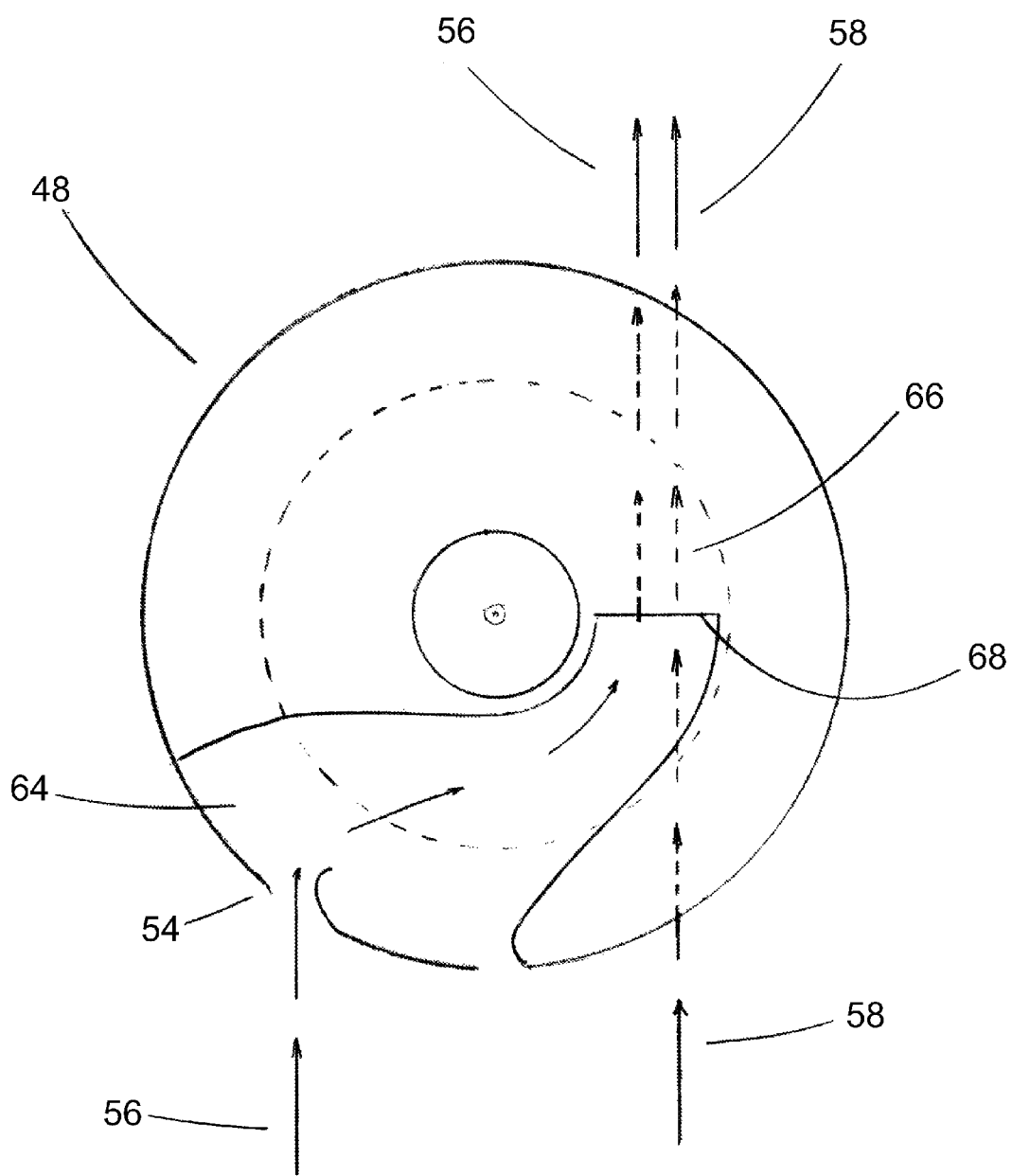
FIG. 1F is a cut-away bottom view of a flow section incorporated within a slotted fairing.

FIG. 1F depicts a bottom view of an implementation of a slotted fairing 48 whereby flow section 64 is incorporated therewithin. Return blade fluid flow components 56 enter overlapping annular slots 54, travel through flow section 64 to be exhausted through outlet vent 68 to the opposite side of fairing 48. Upon exiting outlet 68 flow component 56 enters blade area 66 whereby it positively impacts the forward blade (not shown), in addition to flow component 58 that already impacts the forward blade positively, rather than negatively impacting the return blade (also not shown) to thereby increase the efficiency of the prime mover. Although one flow section is shown it should be understood that multiple flow sections could be included within the slotted fairing 48.

Flow sections 64 could be combined with a manifold, with one or more entrances and one or more exit paths in one-to-one, one-to-many, or many-to-many relationships between entrances and exits, to further increase the magnitude of desirable force components exiting from within a fairing, and/or improve the direction of these components, to impact the blades more desirably and increase the efficiency of the prime mover.

Figure 1G:
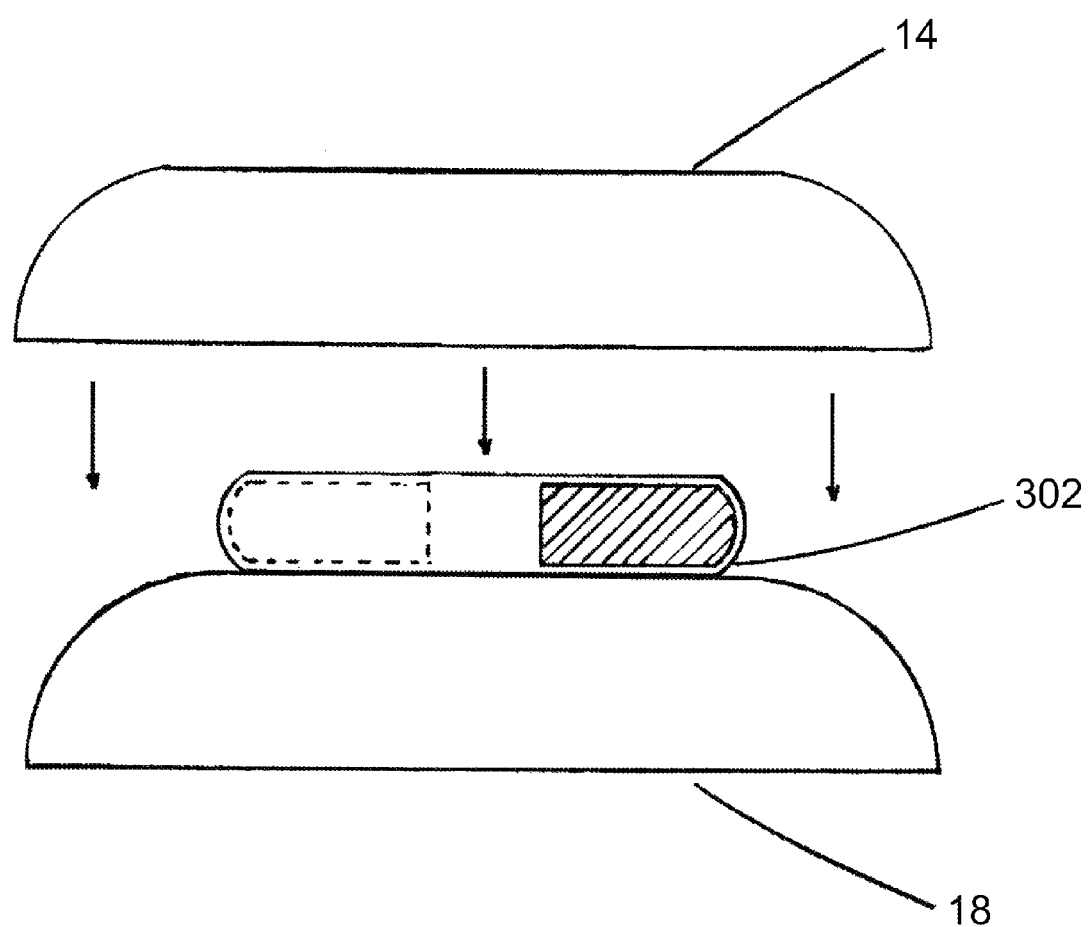
FIG. 1G is a side view of an invertible fairing.
Figure 1H:
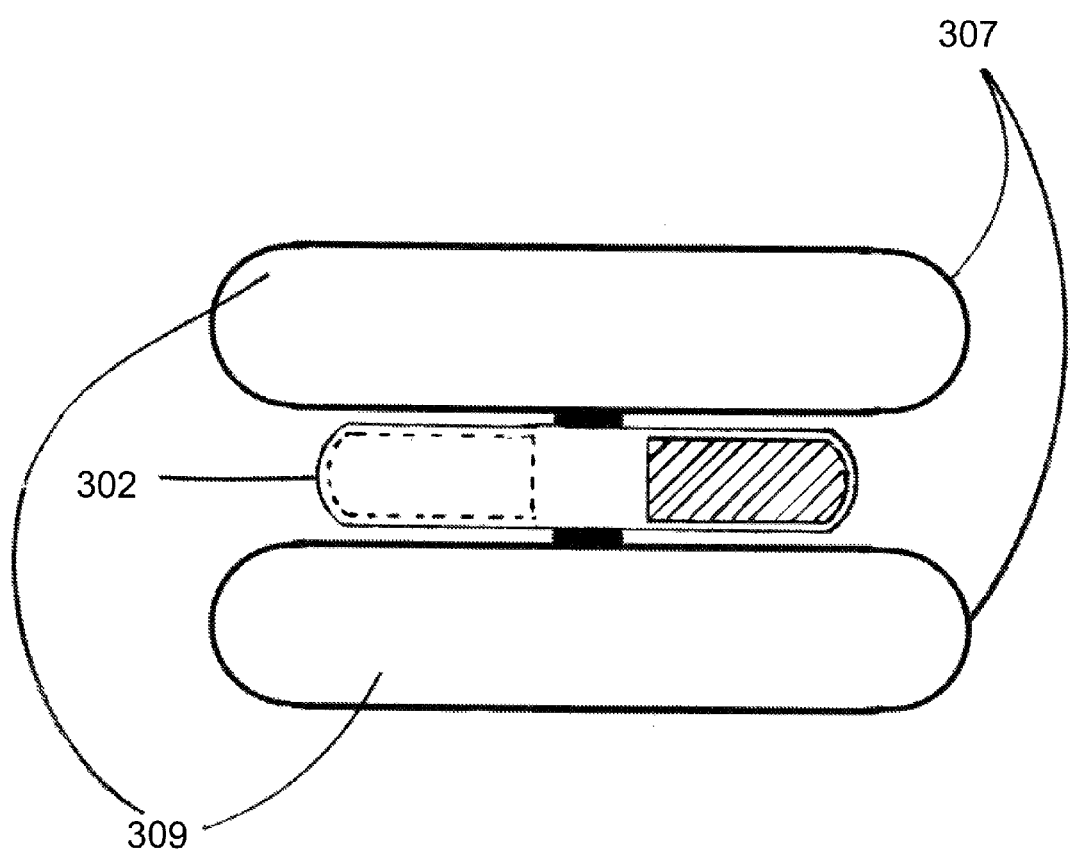
FIG. 1H is a side view of a prime mover with a fairing having semicircular peripheral edges.
Figure 1I:
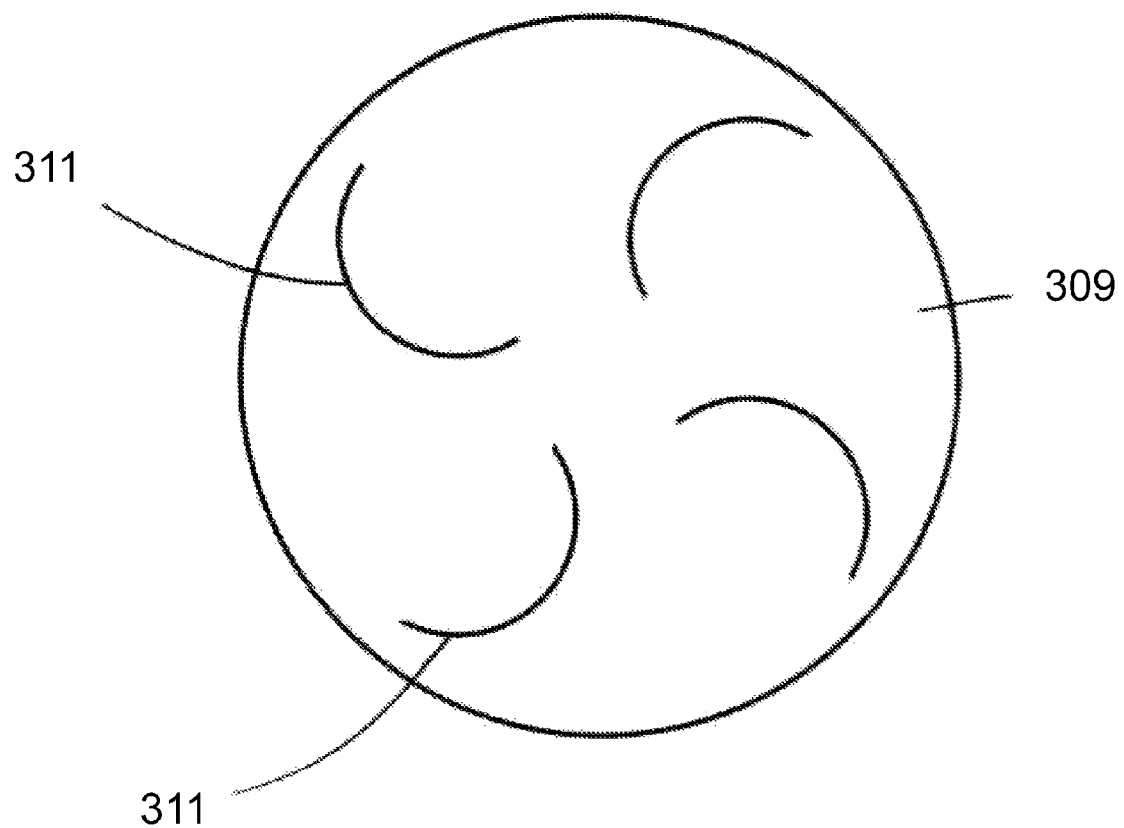
FIG. 1I is a top view of a prime mover illustrating anchoring vanes attached to the bottom of the fairing for slowing or stopping the fairings from turning in the water while the prime mover is floating and generating electricity.

FIG. 1G depicts an implementation whereby one fairing 14 is inverted when not in use to save space and/or protect blade assembly 302 for shipping, storage, portability, or other purposes.

FIGS. 2A, 2B, 2C, 3A, 3B, 4, 5A, 5B, 6A and 6B depict several different configurations of blade assembly 22. Each blade assembly preferably rotates about a vertical axis but is not limited to such an orientation. Further, while several configurations are depicted, prime mover 10 is not limited to the embodiments disclosed, and may include other blade assemblies that incorporate the advantages of the blade assemblies shown in the figures. Some or all of these blades/rotors may be rotated via differentials in pressure and drag to allow them to operate in the more turbulent fluid flow found on building rooftops, towers, or other locations where blades that operate on aerodynamic lift may lose efficiency.

Figure 2A:
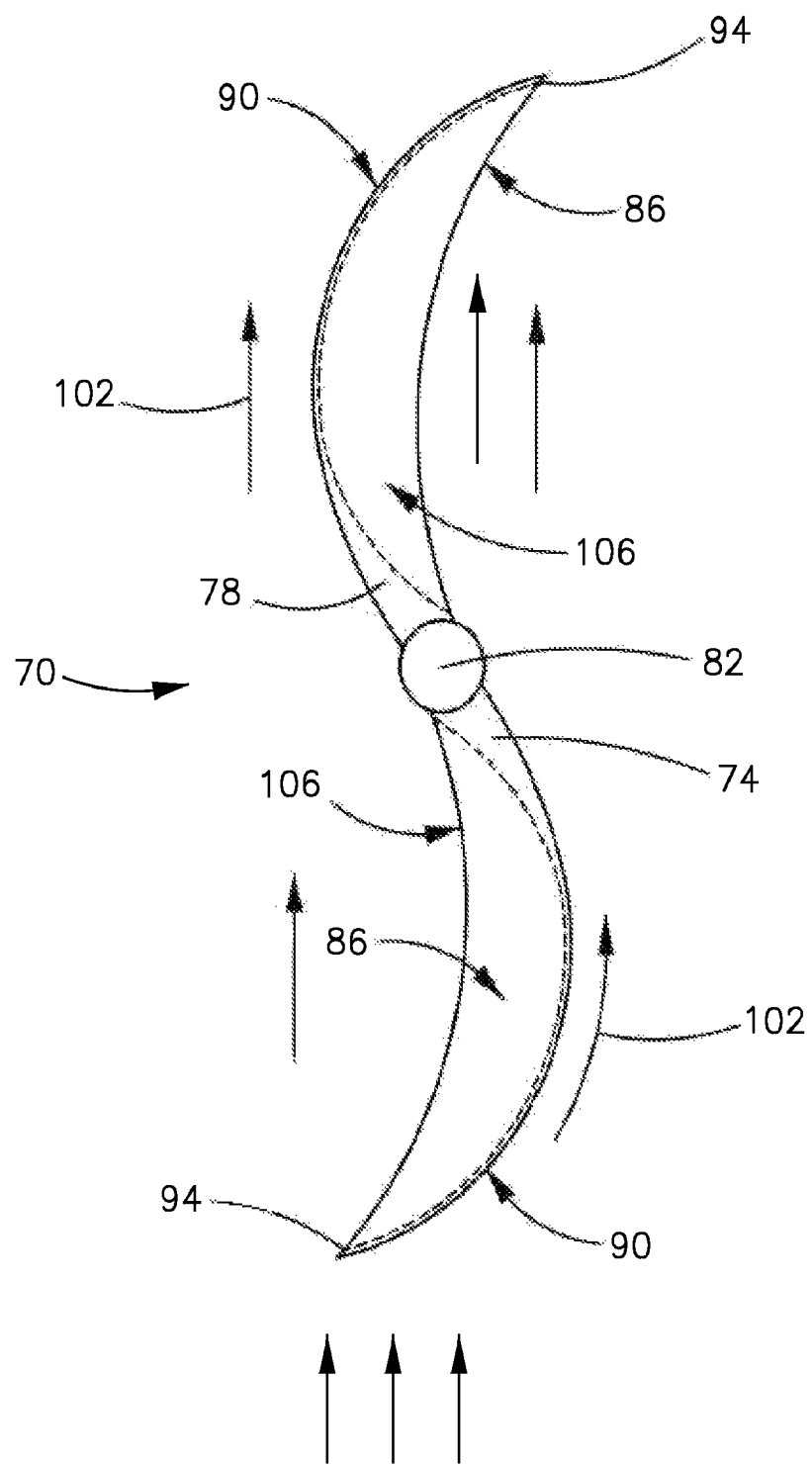
FIG. 2A is a top view of an example embodiment of a blade assembly to be used with a prime mover in accordance with the present invention.

In that regard, FIG. 2A depicts an example embodiment of a blade assembly 70 to be used in a prime mover, such as for example in prime mover 10. As shown, blade assembly 70 includes a first blade 74 and a second blade 78. Each blade 74 and 78 is mounted on a shaft 82, and includes a front face 86 and a back face 90. As shown in FIG. 2A, each blade 74 and 78 is curved such that front faces 86 are concave and back faces 90 are convex. That is, front faces 86 curve in as they extend from a respective tip 94 toward shaft 82 and back faces 90 curve out as they extend from a respective tip 94 toward shaft 82. Because blades 74 and 78 are curved, as a fluid 102 flows along the convex back faces 90 of the blades, a horizontal component of fluid 102 tends to pull the blades into the incoming fluid during the blades' return path.

As shown in FIG. 2A, front faces 86 each define a cavity 106 for catching an incoming fluid such as for example wind. As the fluid flows, cavities 106 will catch the fluid and thereby rotate blade assembly 70. Therefore, because of the shape and features of blades 74 and 78, each blade 74 and 78 is capable of being pushed and pulled by the flowing fluid depending on where in the rotation blade assembly 70 is located.

As shown in FIG. 2A, one tip 94 curves into the flowing fluid while the other tip 94 curves away from the flowing fluid. Such a feature helps rotate the blade assembly 70. In that regard, tips 94 of blade assembly 70 take advantage of leverage to thereby obtain maximum power from the flowing fluid.

FIG. 2B depicts a similar blade assembly as shown in FIG. 2A, but includes three blades as opposed to two. As shown, a blade assembly 110 includes a first blade 114, a second blade 118 and a third blade 122. Each blade 114, 118 and 122 includes a convex back face 126 and a concave front face 130 that defines a cavity 134. Front faces 130, back faces 126 and cavities 134 are similar to those described for blade assembly 70 and thus operate in a similar manner and provide the same advantages over conventional blades.

FIG. 2C is a partial cross-sectional view depicting a cross section of a blade that may form part of a blade assembly, such as for example blade assembly 22 or blade assembly 70. As shown, a blade 150 has a front face 154 and a back face 158. Front face 154 defines a cavity 162 and back face 158 is shaped to deflect a fluid as blade 150 cuts through the fluid. While back face 158 is shown as being rounded, it should be appreciated that back face 158 may have other configurations for cutting through a fluid. For example, back face 158 may have a curved shape.

Figure 3A:
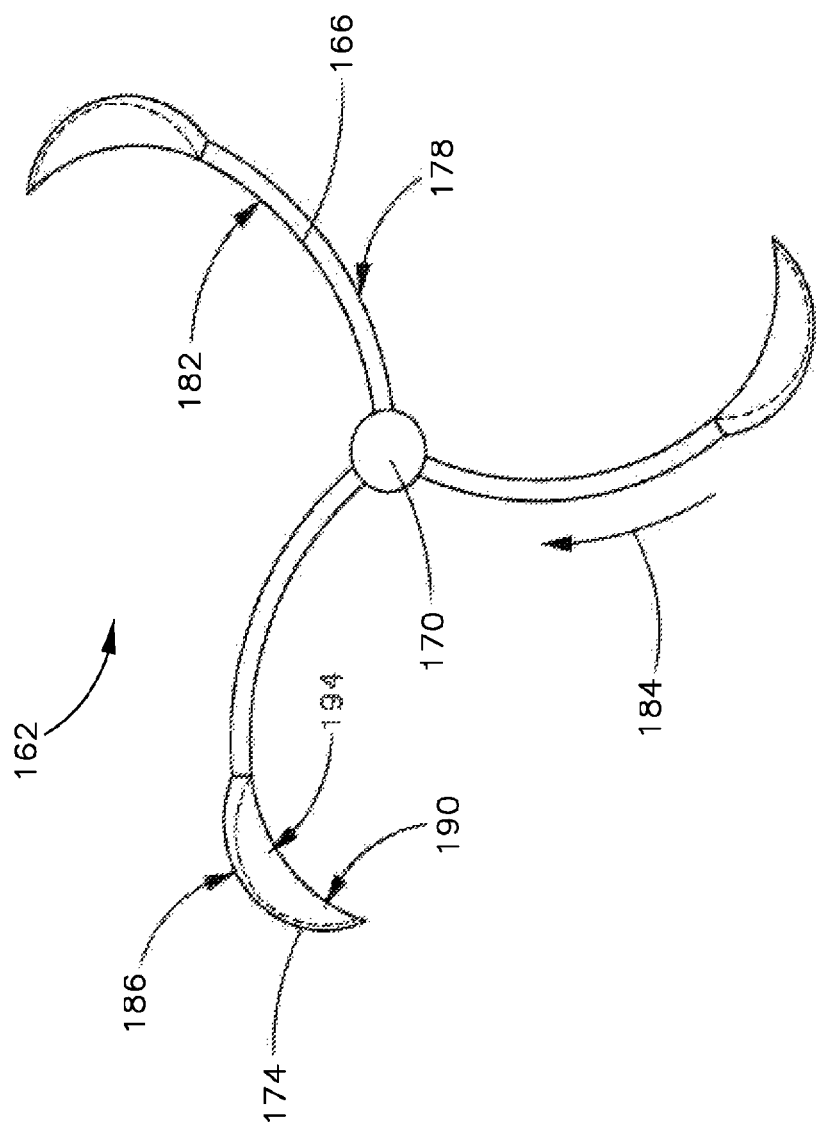
FIG. 3A is a top view of another example embodiment of a blade assembly to be used with a prime mover in accordance with the present invention.

FIGS. 3A and 3B depict two more embodiments of a blade assembly that may be used in a prime mover, such as for example in prime mover 10. The blade assemblies depicted in FIGS. 3A and 3B each include a smaller blade that is attached to an arm. Such a configuration may be more economical and may focus the power of a flowing fluid where the blade assemblies have the most leverage.

As shown in FIG. 3A, a blade assembly 162 includes three arms 166 attached to a shaft 170, wherein each arm 166 has a blade 174 extending from a distal end thereof. Because blades 174 extend from a distal end of arms 166, the power of a flowing fluid will be focused at a point where blade assembly 162 has the most leverage.

As shown in FIG. 3A, each arm 166 is curved having a convex backside 178 and a concave front side 182. By having this particular configuration, a fluid 184 flowing along arms 166 may help pull arms 166 into the fluid during the arms' return. Similarly, blades 174 have a convex back face 186 and a concave front face 190 that defines a cavity 194. Back faces 186, front faces 190 and cavities 194 are similar to those described for blade assembly 70 and thus operate in a similar manner and provide the same advantages over conventional blades.

FIG. 3B depicts a similar blade assembly as blade assembly 162 shown in FIG. 3A except that the blade assembly shown in FIG. 3B has four arms and blades as opposed to three, and the arms are straight as opposed to curved. As shown, a blade assembly 200 includes four arms 204 attached to a shaft 208, wherein each arm 204 has a blade 212 extending from a distal end thereof. Because blades 212 extend from a distal end of arms 204, the power of a flowing fluid will be focused at a point where blade assembly 200 has the most leverage. Blades 212 have a convex back face 216 and a concave front face 220 that defines a cavity 224. Back faces 216, front faces 220 and cavities 224 are similar to those described for blade assembly 70 and thus operate in a similar manner and provide the same advantages over conventional blades.

FIG. 4 depicts another embodiment of a blade assembly that may be used in a prime mover, such as for example in prime mover 10. As shown, a blade assembly 230 includes a flywheel 234 mounted on a shaft 238, and several blades 242 extending from a periphery of flywheel 234. As shown, each blade 242 has a convex back face 246 and a concave front face 250 that defines a cavity 254. Back faces 246, front faces 250 and cavities 254 are similar to those described for blade assembly 70 and thus operate in a similar manner and provide the same advantages over conventional blades.

FIGS. 5A and 5B depict another embodiment of a blade assembly that may be used in a prime mover, such as for example in prime mover 10. The blade assembly shown in FIGS. 5A and 5B is similar to the one shown in FIG. 4 except that the blades are incorporated within the flywheel. In that regard, a blade assembly 270 includes a flywheel 274 mounted on a shaft 278 and several airfoils 282 incorporated into flywheel 274. As shown in FIG. 5A, each airfoil 282 includes a convex back face 286 and a concave front face 290. As shown in FIG. 5B, each front face 290 along with portions of flywheel 274 define a cavity 294 for catching a fluid 298.

Figure 6A:
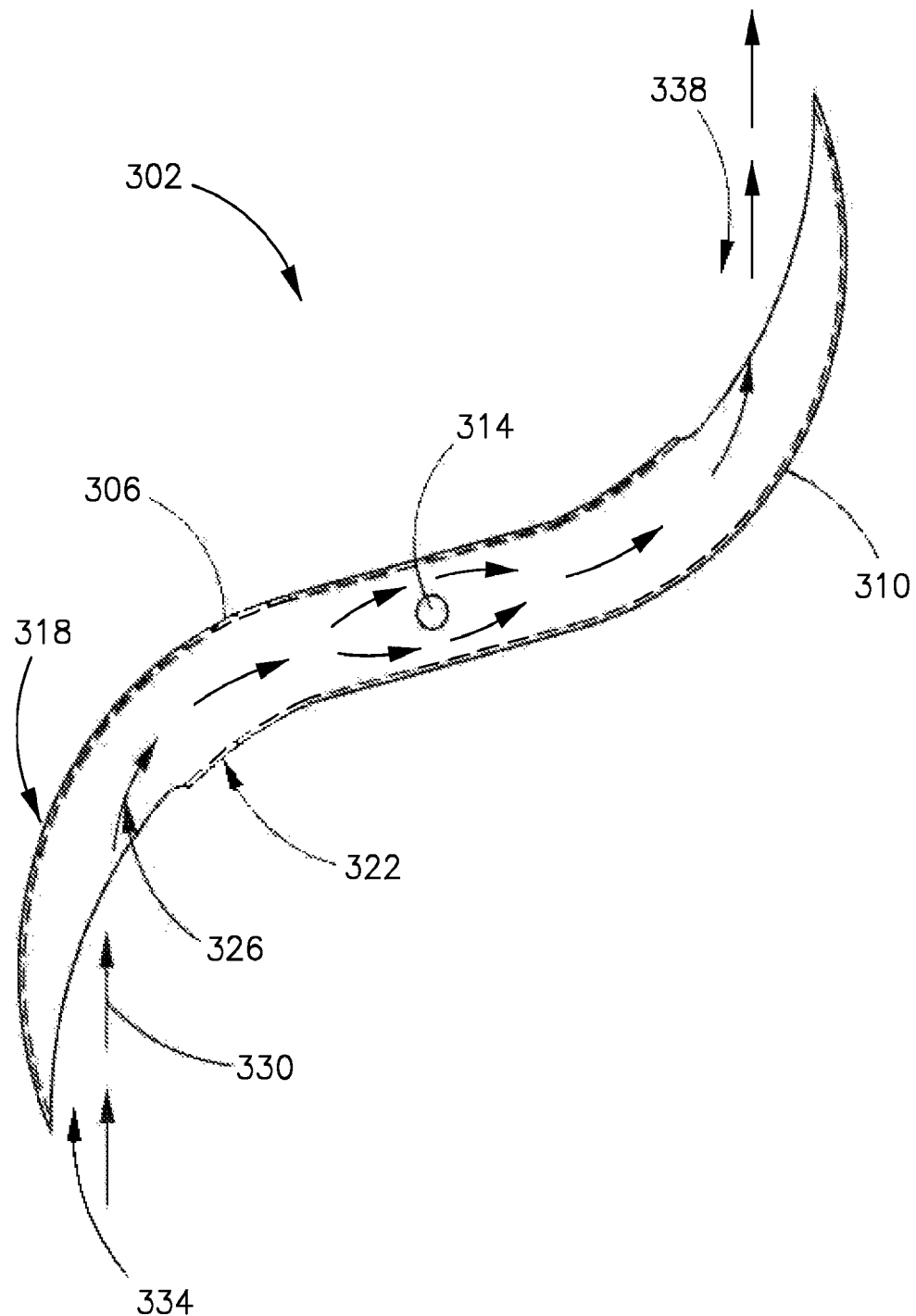
FIG. 6A is a top view of another example embodiment of a blade assembly to be used with a prime mover in accordance with the present invention.
Figure 6B:
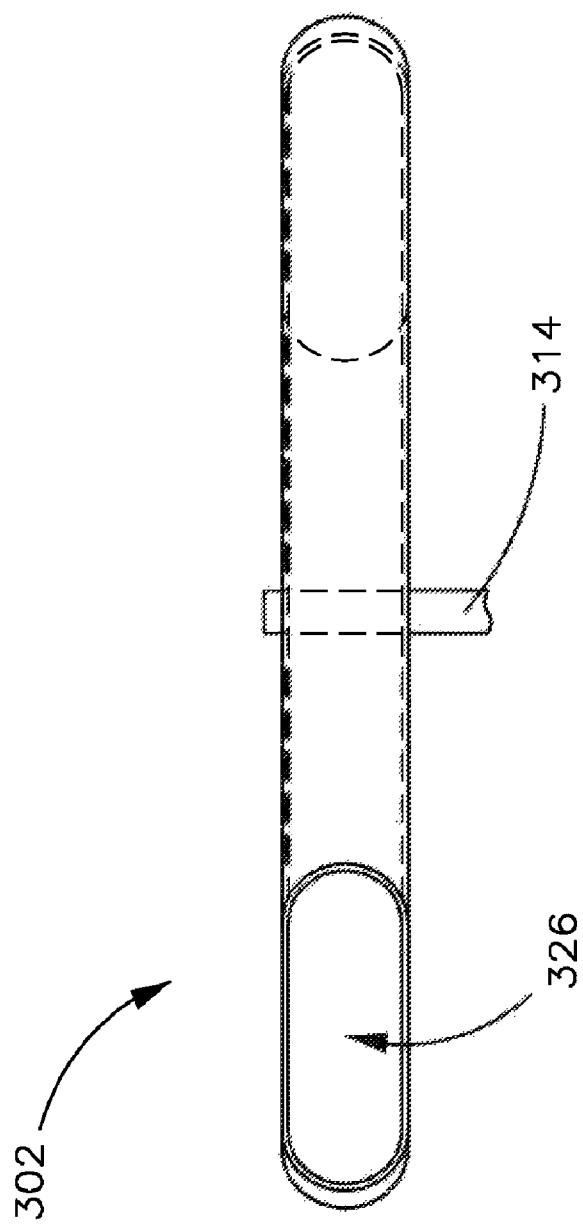
FIG. 6B is a side view of the blade assembly shown in FIG. 6A.

FIGS. 6A and 6B depict another embodiment of a blade assembly that may be used in a prime mover, such as for example in prime mover 10. The blade assembly shown in FIGS. 6A and 6B is hollow to allow a fluid to flow through the blades. As shown, a blade assembly 302 includes a first blade 306 and a second blade 310 interconnected with the first blade 306. The interconnected blades are mounted on a shaft 314. Each blade 306 and 310 includes a convex back face 318 and a concave front face 322 that defines a cavity 326. As shown in FIGS. 6A and 6B, cavities 326 are also connected to allow a flowing fluid 330 to pass therethrough. By allowing fluid 330 to pass through, torque may be added to the rotating blade assembly and a decrease in pressure buildup in undesired locations may result. For example, flowing fluid 330 may take the force from the momentum change of the fluid flow at both an inlet 334 and an outlet 338 of the interconnected blades 306 and 310. These momentum changes may produce desirable force components (i.e. pushes the blade at the inlet and propels the blade at the outlet). Back faces 318 and front faces 322 are similar to those described for blade assembly 70 and thus operate in a similar manner and provide the same advantages over conventional blades.

Figure 7A:
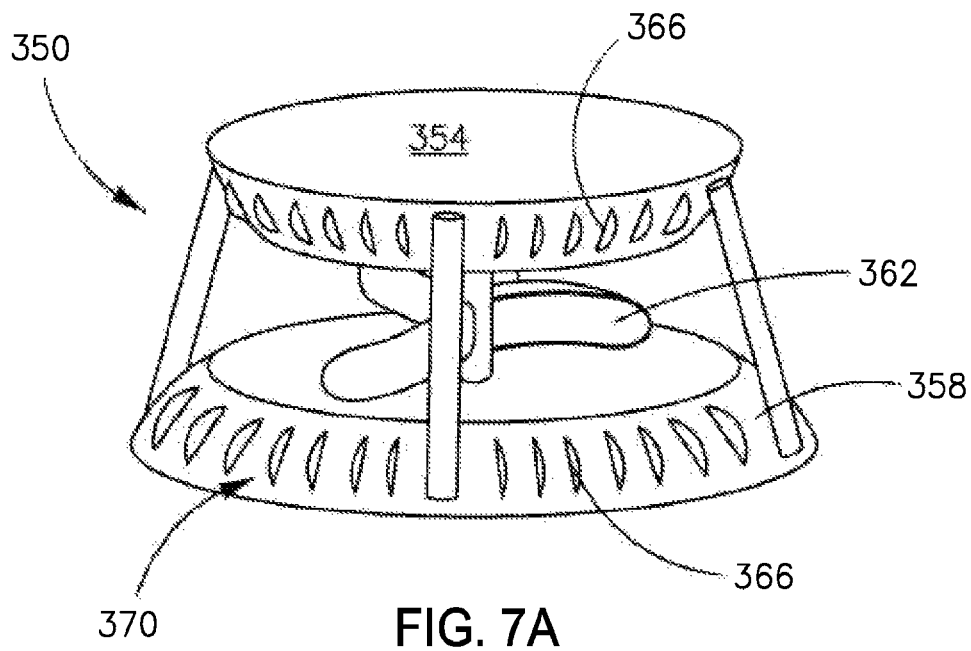
FIG. 7A is an isometric view depicting a prime mover having asymmetrically sized fairings.
Figure 7B:
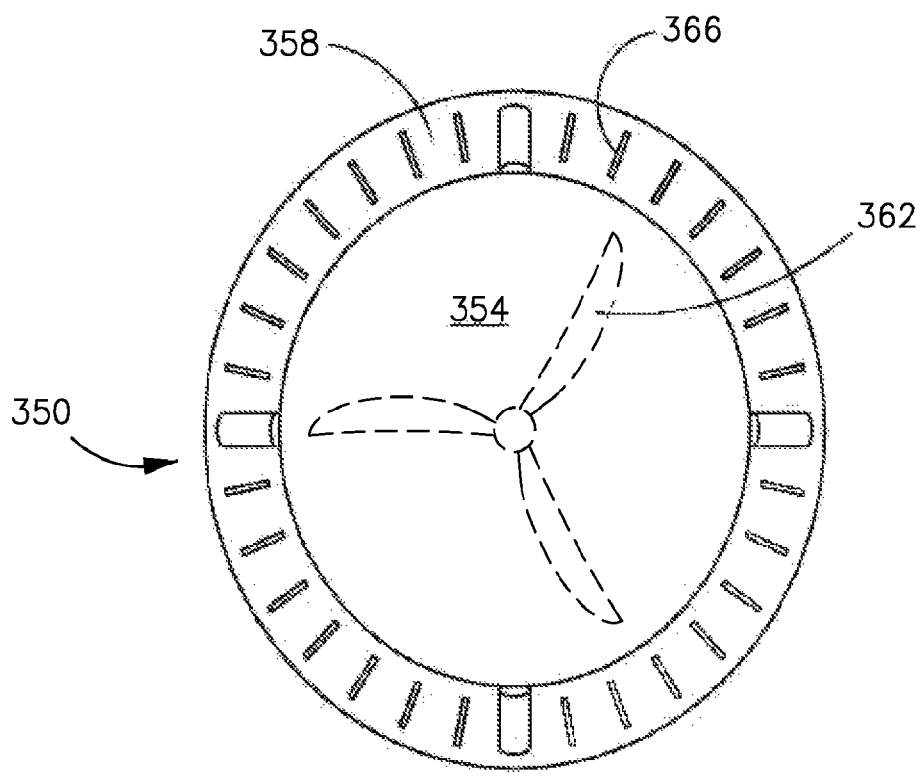
FIG. 7B is a top view of the prime mover shown in FIG. 7A.

FIGS. 7A and 7B depict a prime mover having asymmetrically sized fairings to allow wider angles for a fluid to enter. As shown, a prime mover 350 may include a first fairing 354, a second fairing 358 and a blade assembly 362 positioned between the first and second fairings. As shown, first fairing 354 may be sized smaller than second fairing 358. Therefore if a fluid were to flow from above, the fluid would still be guided toward blade assembly 362 because it would not be obstructed by the fairing. While prime mover 350 is shown as having a top fairing that is smaller, it should be understood that the bottom fairing could be smaller than the top fairing.

As shown in FIGS. 7A and 7B, a prime mover may also include protruding guide vanes. As shown, fairings 354 and 358 each include protruding guide vanes 366 for guiding the flowing fluid toward blade assembly 362. Preferably, guide vanes 366 are disposed on a peripheral surface 370 of each fairing 354 and 358. Though not shown, guide vanes 366 may pivot to orient themselves with the direction of fluid flow peripheral surface 370 either manually or automatically.

Figure 8A:
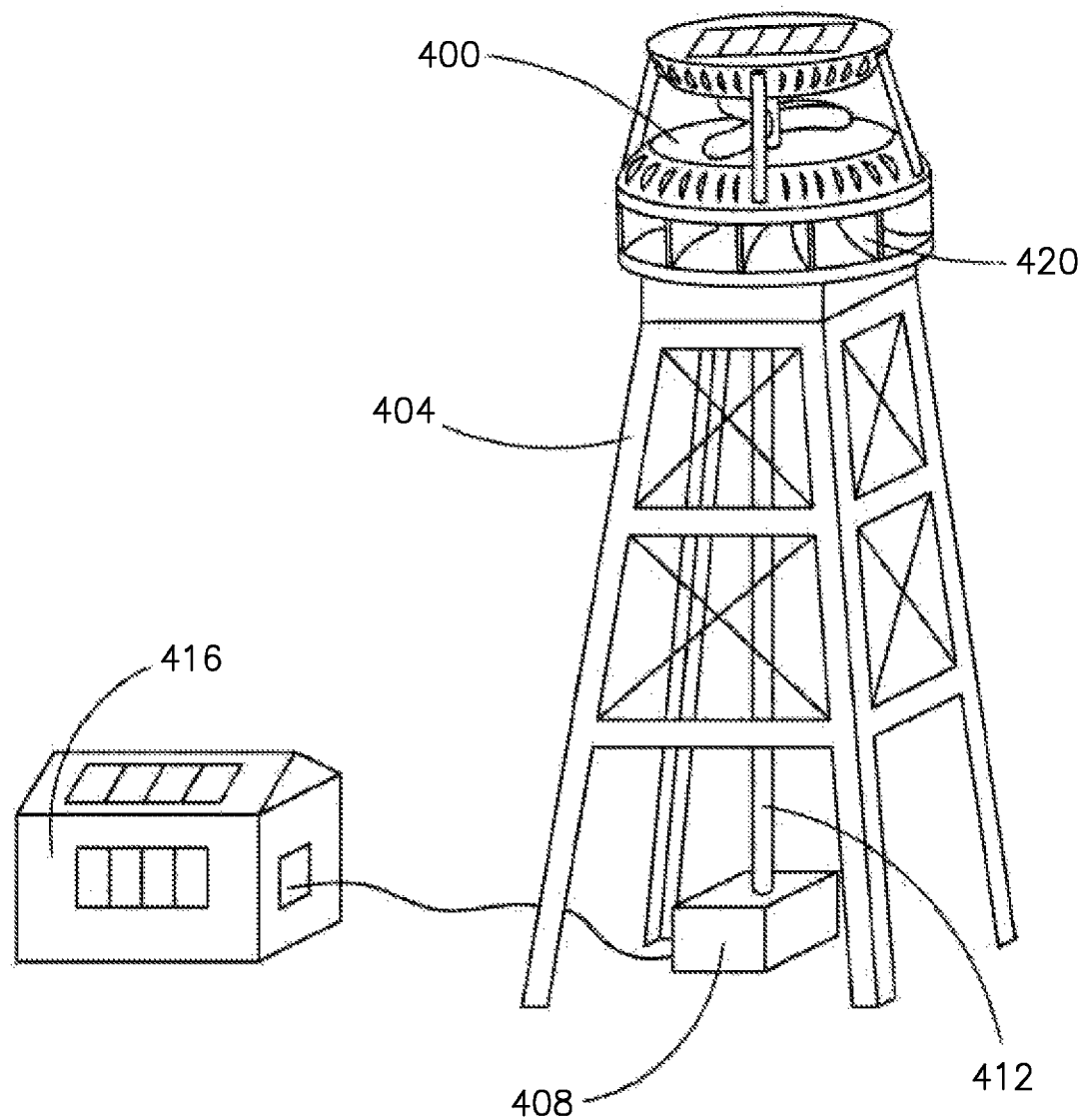
FIG. 8A is a schematic depicting a prime mover mounted on a tower.

Prime movers according to the invention may be placed on a variety of structures that may not have been practical for conventional wind mills. The devices may be built with the structure or retrofit to existing structures. For example, as shown in FIG. 8A a prime mover 400 may be placed on top of a tower 404. Tower 404 may be any type of tower including a tower for transmitting signals such as a cell phone tower. Because prime mover 400 lies in a horizontal plane prime mover 400 may minimize shear stress on tower 404 and thus allows a user to place prime mover 400 at the top of tower 404 thus placing prime mover 400 in a position to take advantage of higher wind speeds with less turbulence. Of course, the prime mover 400 may be placed at different positions within the tower as desired to access higher wind speeds and lower turbulence.

As shown in FIG. 8A, a generator 408 may be placed lower or on the ground proximate to tower 404 and may be coupled to prime mover 400 by a shaft 412. As prime mover 400 is powered by wind, shaft 412 will rotate and generator 408 will generate electricity. The electricity may then be delivered to a power grid or stored for use at a later time in an energy storage area, such as to power grid 416 shown in FIG. 8A, for example. Alternatively, the electricity may be consumed immediately by a device. By having such a configuration, generator 408 may be proximate to the ground allowing for easier maintenance. Furthermore a larger generator may be used because the weight of generator 408 is no longer placed on the tower. Such a configuration may also provide power for the electrical components of the tower 404 so that the tower 404 need not necessarily be connected to the power grid.

Because prime mover 400 lies in a horizontal plane, prime mover 400 may maintain a low profile and may be stackable, in that it may be stacked on top of additional prime movers or other devices. For example, as shown in FIG. 8A, prime mover 400 is stacked on top of an airfoil 420. By stacking the prime movers, the blade assemblies for each prime mover may be oriented at different angles to smooth fluctuations in torque. Furthermore, the amount of power available may be increased.

Figure 8B:
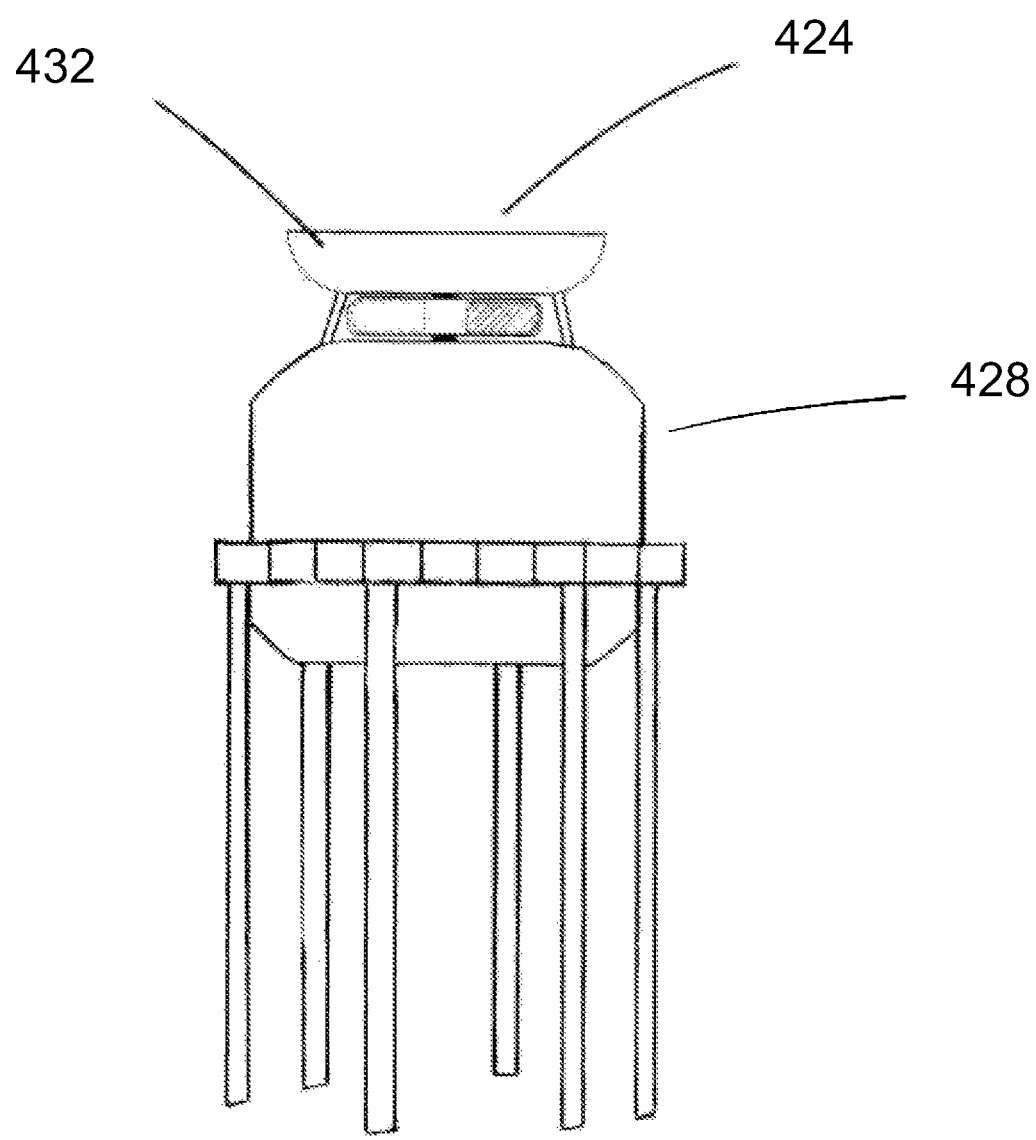
FIG. 8B is a schematic depicting a prime mover mounted on a water tower.

In a similar manner a prime mover 424 of FIG. 8B may also be mounted on a curved roof tower or other structure such as a water tower 428, whereby the curved roof of the structure acts as one of the fairings and further adds to the velocity increasing effects of the fairing 432.

Prime movers according to the invention, turbines, blades, rotors, or other energy conversion devices may also be placed within flow guides. For example FIGS. 9A, 9B, 9D, 10A, 10B, 10C, 10D, 10E, 10F, and 10G depict prime movers, and other devices described above, placed in different flow guides. Implementation of these flow guides may help increase the velocity of a fluid toward the blade assemblies and may also help guide a fluid around obstacles to avoid turbulence.

Figure 9A:
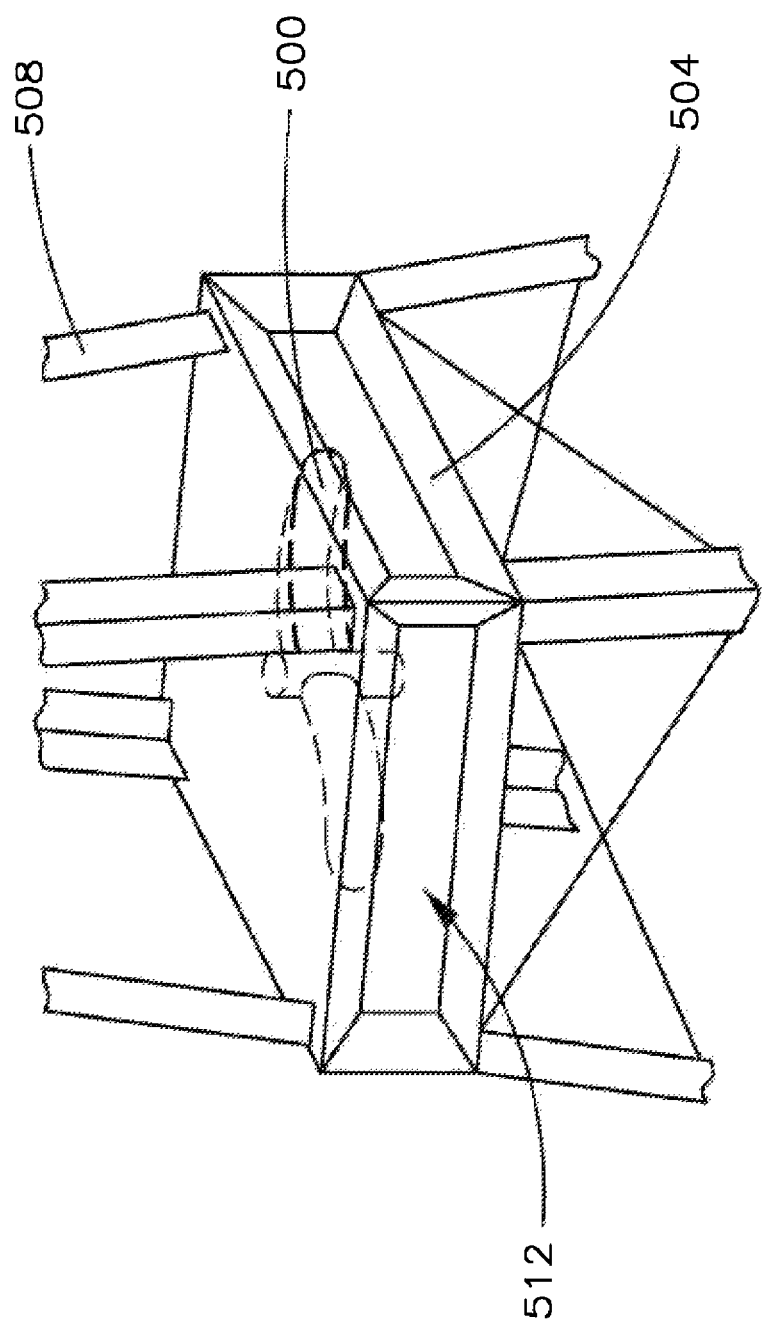
FIG. 9A is partial isometric view depicting a prime mover disposed within a flow guide.
Figure 9B:
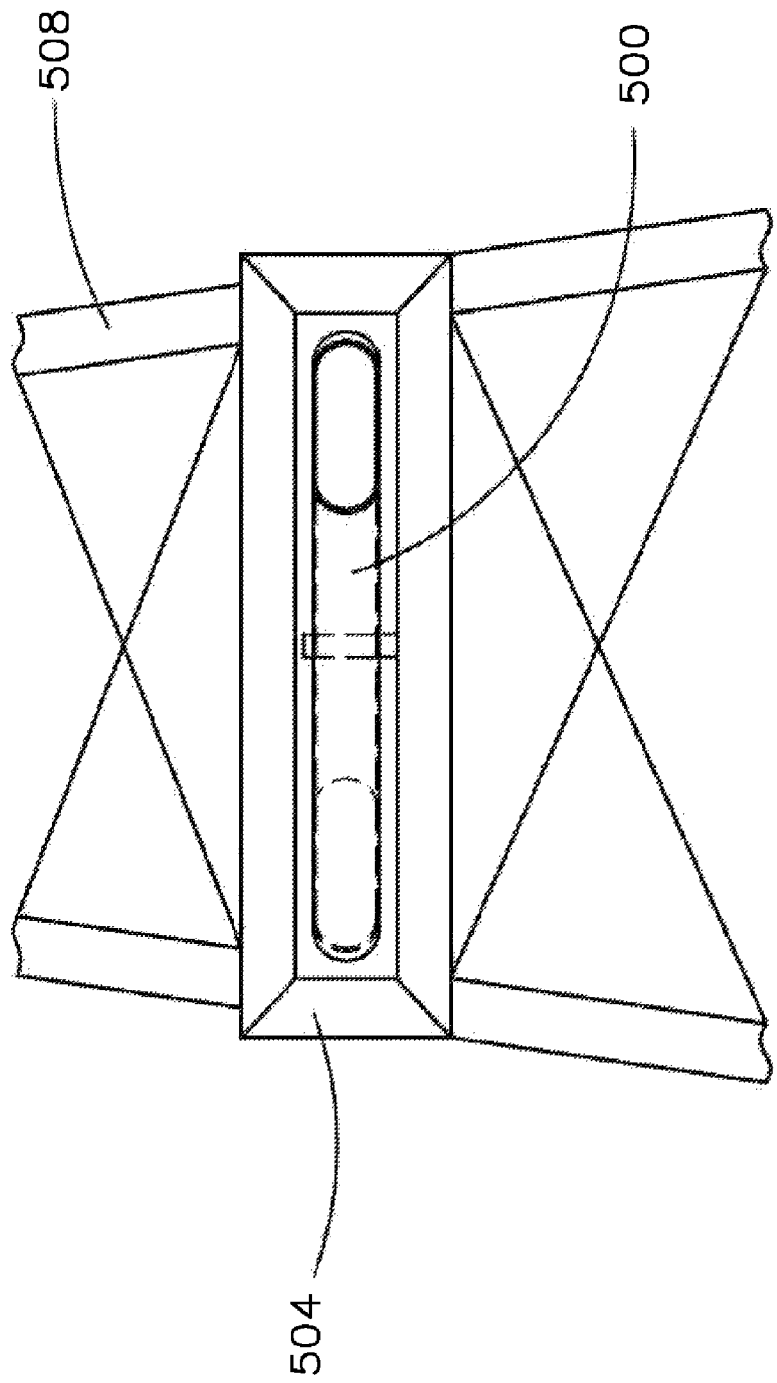
FIG. 9B is a side view of the prime mover and flow guide shown in FIG. 9A.

As shown in FIGS. 9A and 9B, a blade assembly 500 is placed within flow guide 504. As shown, flow guide 504 is connected to a tower 508 and may be square shaped. Flow guide 504 is hollow and includes passageways 512 with inlets on each side of the square. Accordingly, a fluid may enter and be guided toward blade assembly 500 from any direction.

Figure 9C:
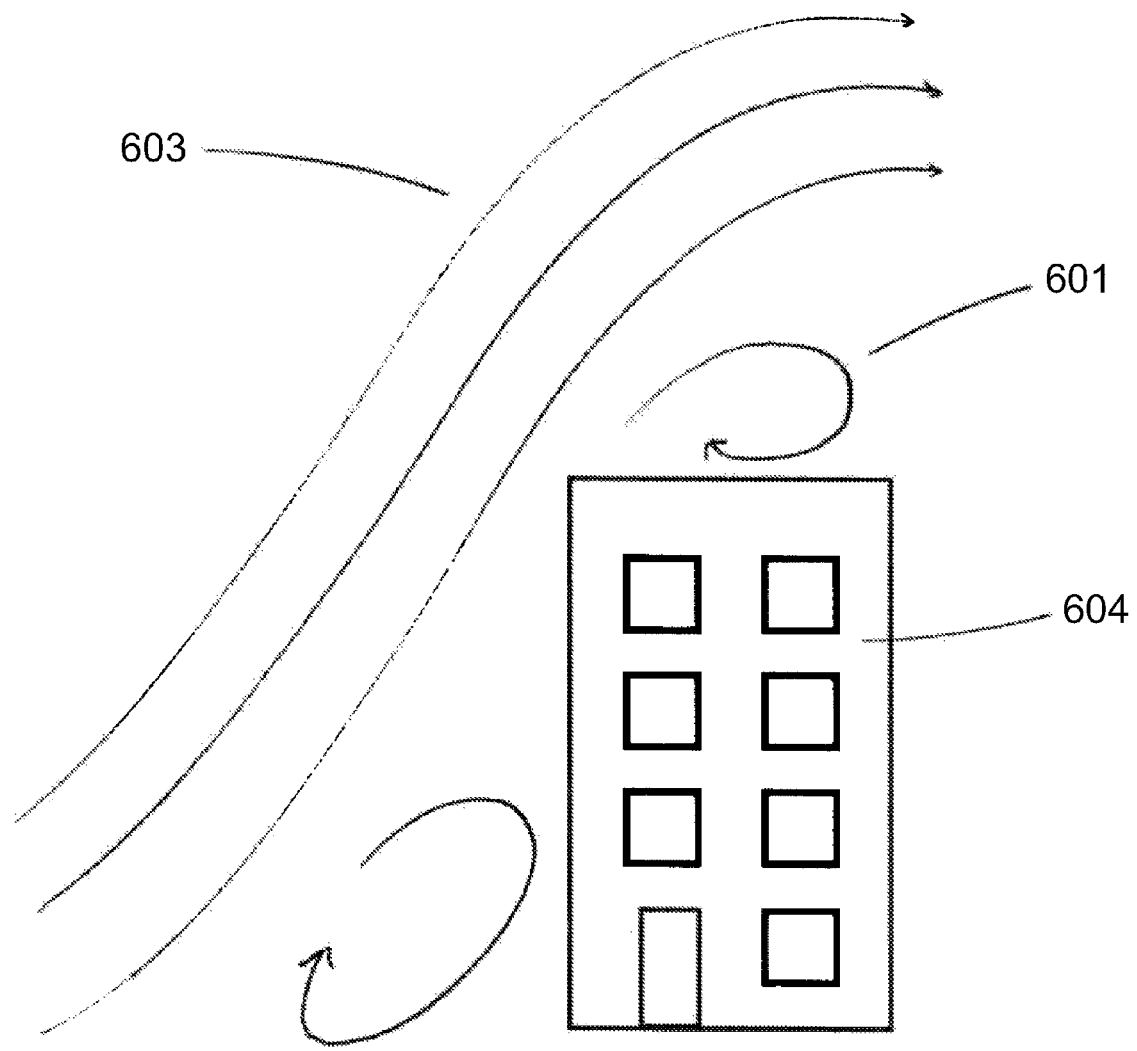
FIG. 9C is a depiction of airflow above a flat-roofed building.
Figure 9D:
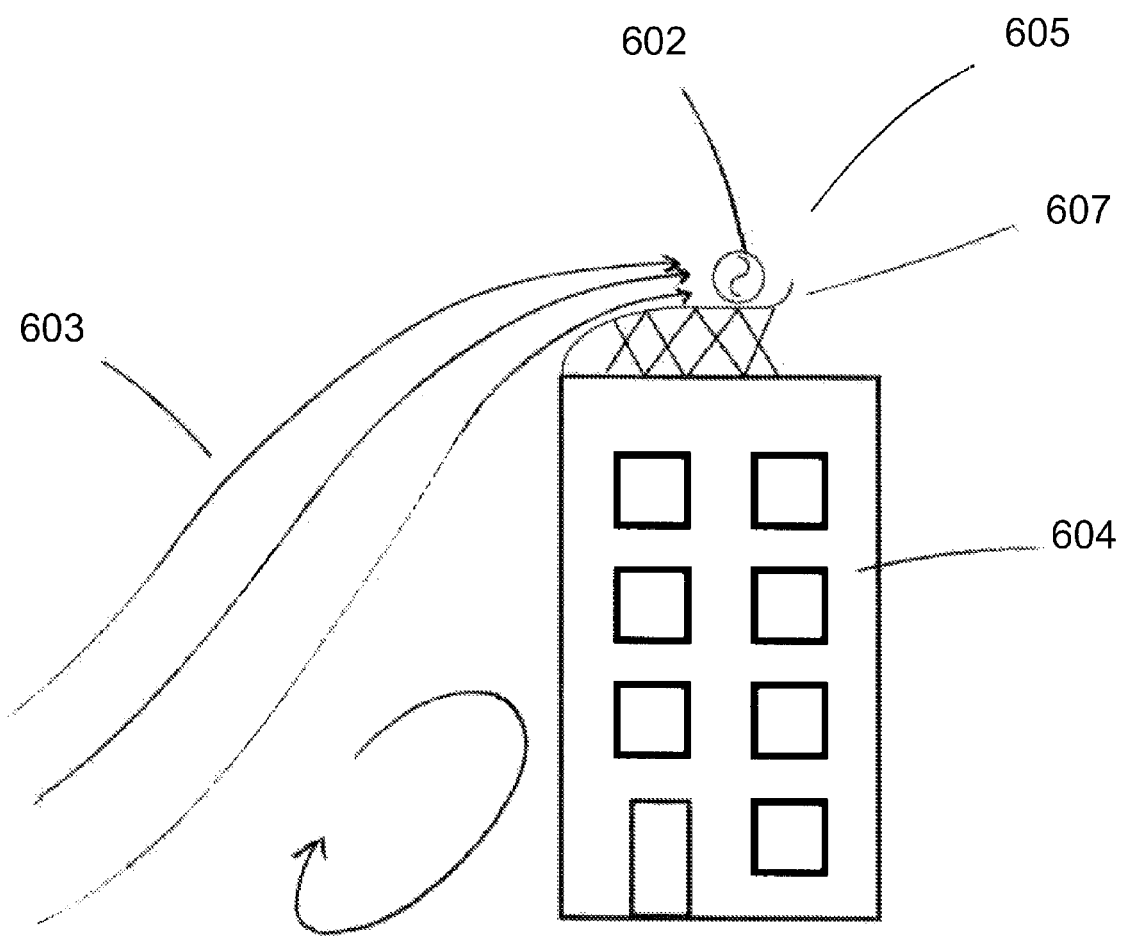
FIG. 9D is a depiction of airflow above a flat-roofed building being drawn to a prime mover.

Flat roofed buildings, and other bluff bodies, have airflow characteristics as shown in FIG. 9C whereby high velocity airflow 603 travels high above low velocity airflow 601 above building 604 and out of range of the rooftop making high velocity airflow difficult and expensive to access. Prime mover 605, shown in FIG. 9D, accesses high velocity flow 603 with single-walled flow guide 607 which extends from a point proximate to the edge of the building or bluff body through the area whereby the rotor or turbine blades are put into motion. Due to the Coanda effect whereby airflow follows a curved surface, flow guide 607 draws flow 603 down to impact turbine 602 within the prime mover 605.

Figure 10B:
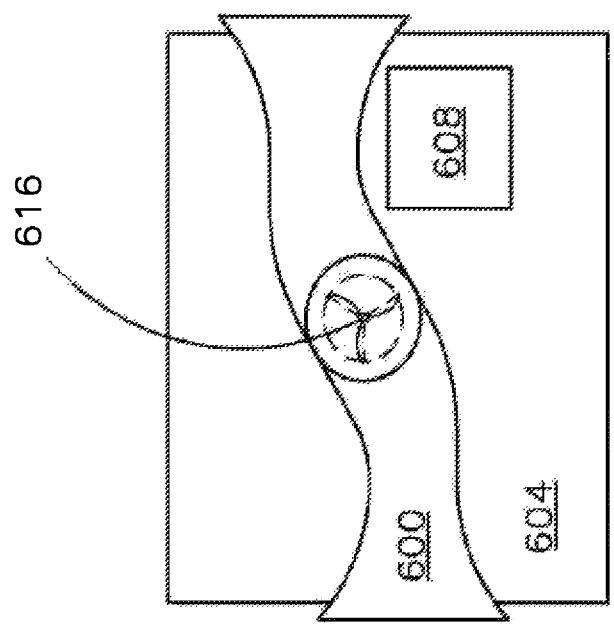
FIG. 10B is a schematic depicting a flow guide for guiding airflow around obstacles.

FIGS. 10A and 10B depict another flow guide placed on top of a building or other bluff body. By implementing flow guides on top of buildings, higher velocity laminar airflow found just off the top edge of a building may be guided toward a prime mover, and may guide the air flow around obstacles before reaching the turbine. As shown, a flow guide 600 may be placed on top of a building 604. Curvature in flow guide 600 may guide wind around obstacles such as obstacle 608, prevent ice, broken blades, or other items from exiting the prime mover, and may guide laminar air flow 612 toward a prime mover 616. In an exemplary implementation, two opposing surfaces of the entrance of the flow guide may be shaped to point in the same direction and point into the direction from which fluid flow 612 reaches the building rooftop to help guide flow 612 into the prime mover. As shown, prime mover 616 may be placed within flow guide 600 and may help generate power using the power of wind. Flow guides may partially enclose or fully enclose a blade assembly, turbine, or rotor on all but two sides allowing for an entrance and exit path for fluid flow.

Figure 10C:
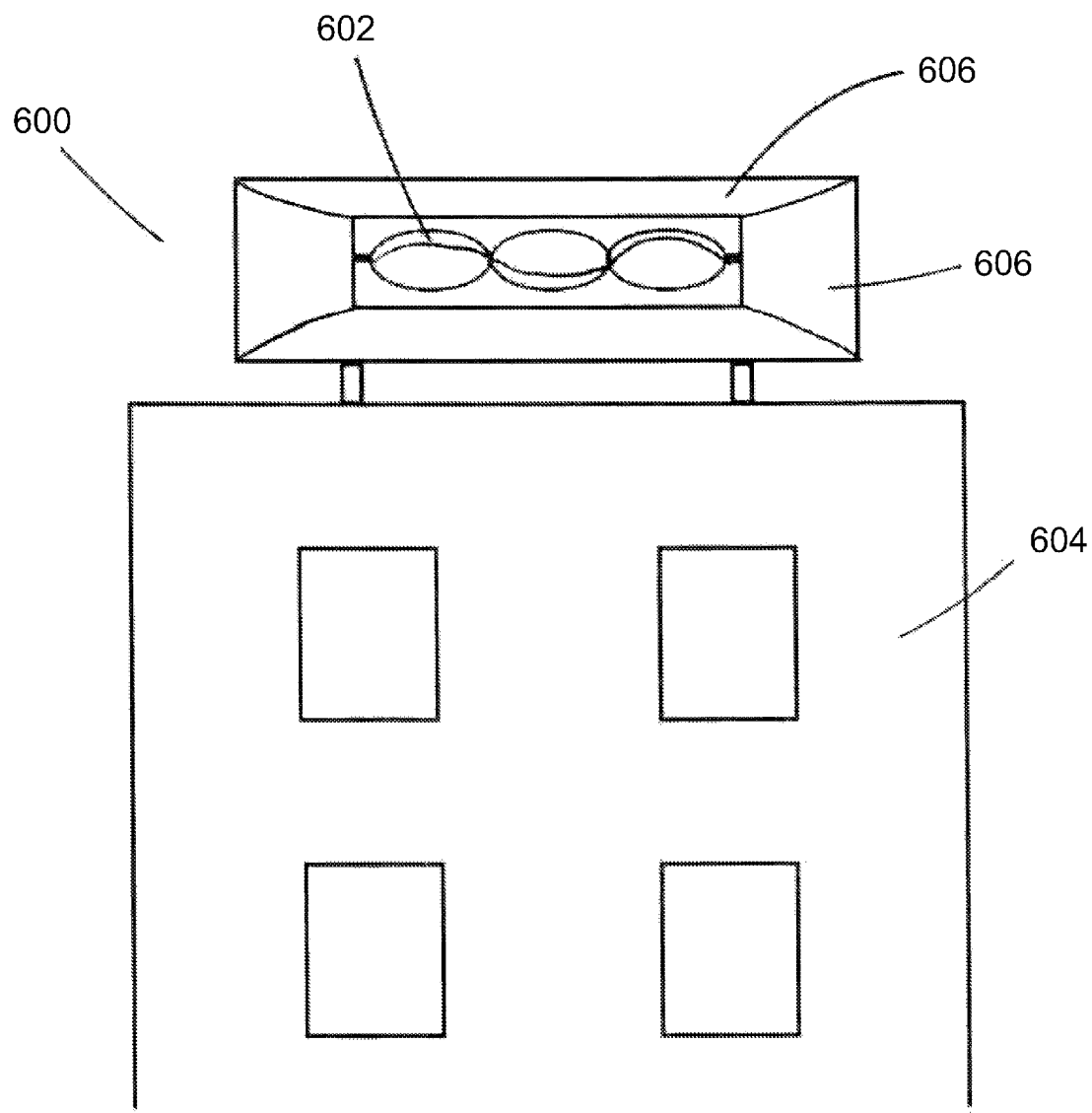
FIG. 10C is a front view of a flow guide with a helical wind turbine incorporated therewithin.

FIG. 10C depicts a front view of another implementation of flow guide 600 mounted on building 604. In this implementation, elongated helix shaped blades or rotors 602 are incorporated within the flow guide 600. The elongated helix shaped blades, turbine, or rotor are oriented parallel to the roof edge and may be parallel to one of the flow guide surfaces. The rotor may have a substantially cylindrical swept surface area (e.g., a Savonius, helical turbine, or other similar cylindrical turbine known to those skilled in the art). A frontal view of curved surfaces 606, which capture airflow from wider angles horizontally and vertically, is provided. It should be understood that the curved, and straight, surfaces of the flow guides that accept fluid flow from wider angles and guide flow around obstacles also can prevent some airflow components from reaching the mounting brackets or other support structure of the turbine itself.

Figure 10D:
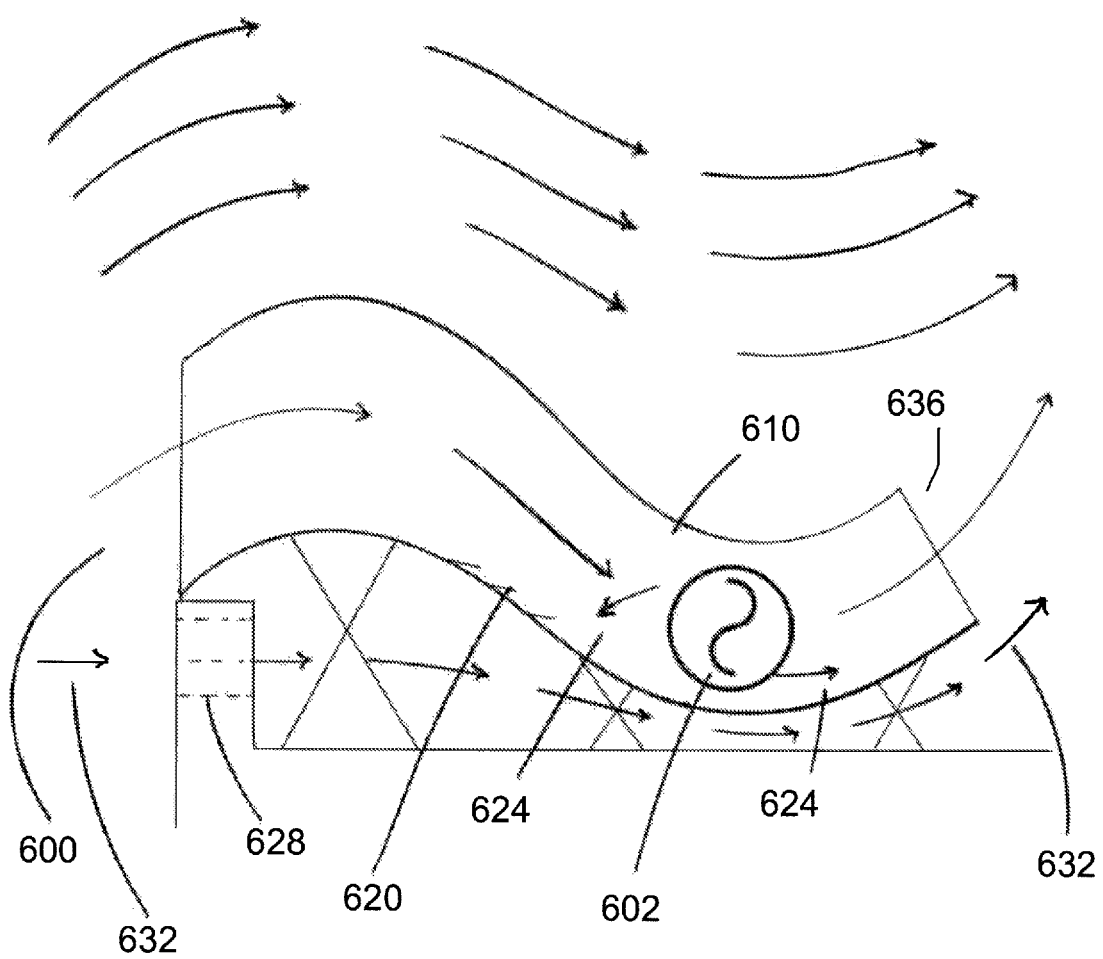
FIG. 10D is a cross sectional side view of another flow guide embodiment.

FIG. 10D depicts a view of flow guide 600 with object blocking protrusions 620 incorporated within curvature 610 to assist the curvature 610 in blocking ice or other objects (represented by arrows 624) from exiting the flow guide 600. Other means known to those skilled in the art could also be used to prevent objects from exiting, while allowing fluid flow to pass (e.g., grating, netting, screens, curvature of the surface of the flow guide 600 as shown in FIG. 10D, or protrusions 620). In this view, curvature 610 is directed in such a way that fluid flow from exit 636, with two opposing surfaces curving in the same direction pointing towards the higher stream velocity as noted above, "reconnects" with high speed flow outside the prime mover 600 to thereby increase its efficiency. The view includes fluid flow path 628 that allows fluid 632 to flow along the outside of one or more walls of flow guide 600 to help lower the stagnation point of incoming fluid flow and help draw increased flow through exit 636. The flow could also be introduced back into the flow guide 600 at a point or points before the exit to help increase the Coanda effect.

Figure 10E:
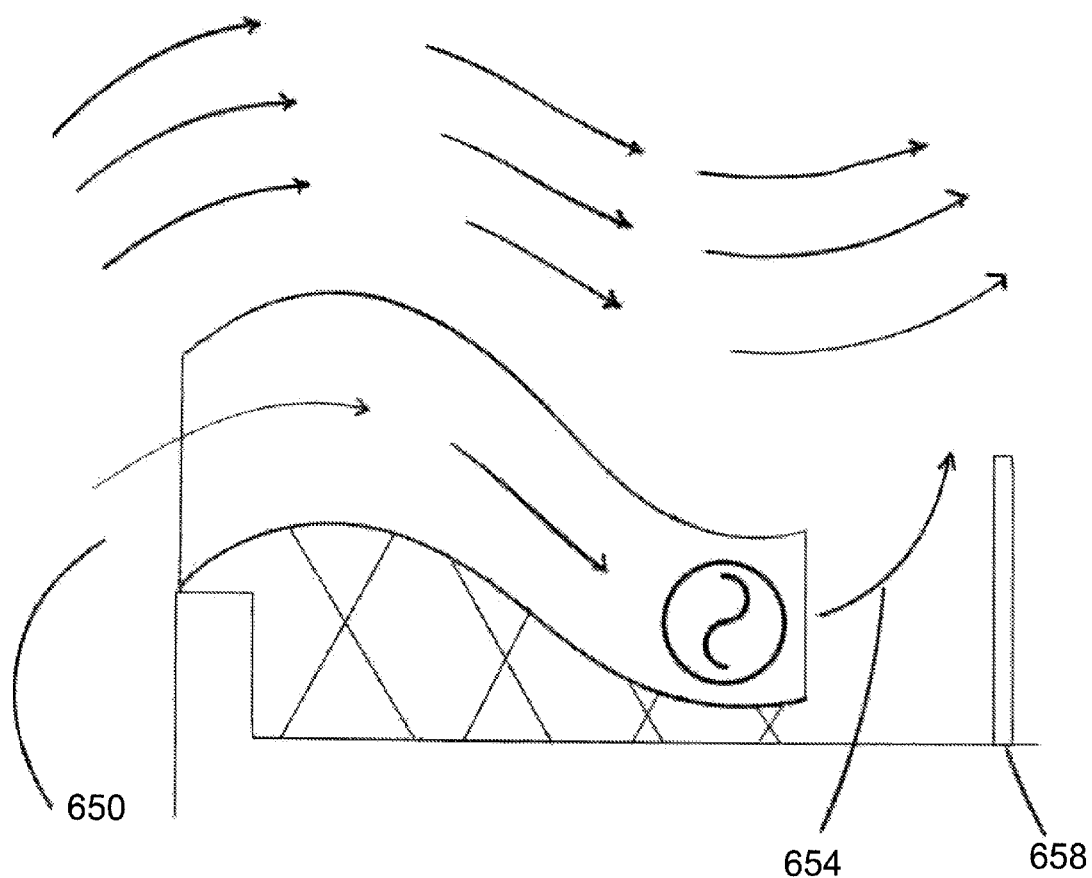
FIG. 10E is a cross sectional side view of yet another flow guide embodiment.

FIG. 10E depicts flow guide 650 whereby exiting fluid flow "reconnects" with the high speed laminar flow external to flow guide 650 by utilizing a separate structure or wall 658 proximate to exit 654.

Figure 10F:
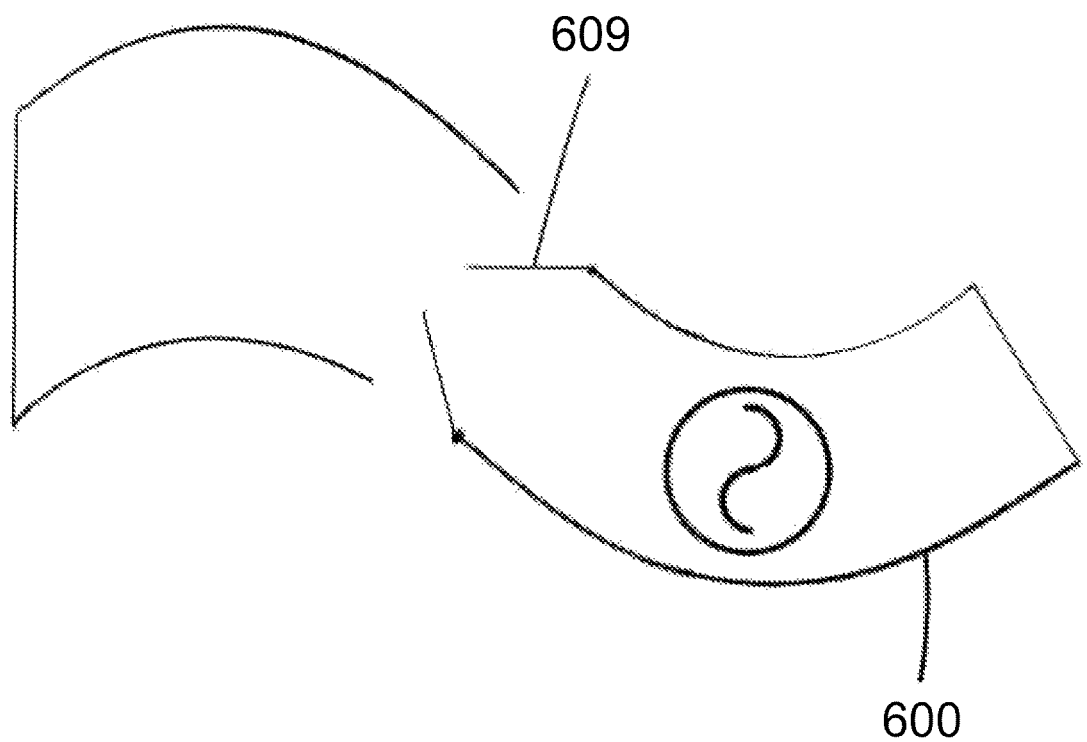
FIG. 10F is a cross sectional side view of flow guide embodiment incorporating mechanical flaps therewithin.

FIG. 10F depicts flow guide 600 incorporating mechanical flaps 609 that could be operated to mechanically slow or stop the turbine for the safety, protection, maintenance, or other needs. It should be understood that other means to slow or stop the turbine for safety, maintenance or other reasons could be incorporated by those skilled in the art (e.g., electrical means, mechanical means, and/or magnetic means).

Figure 10G:
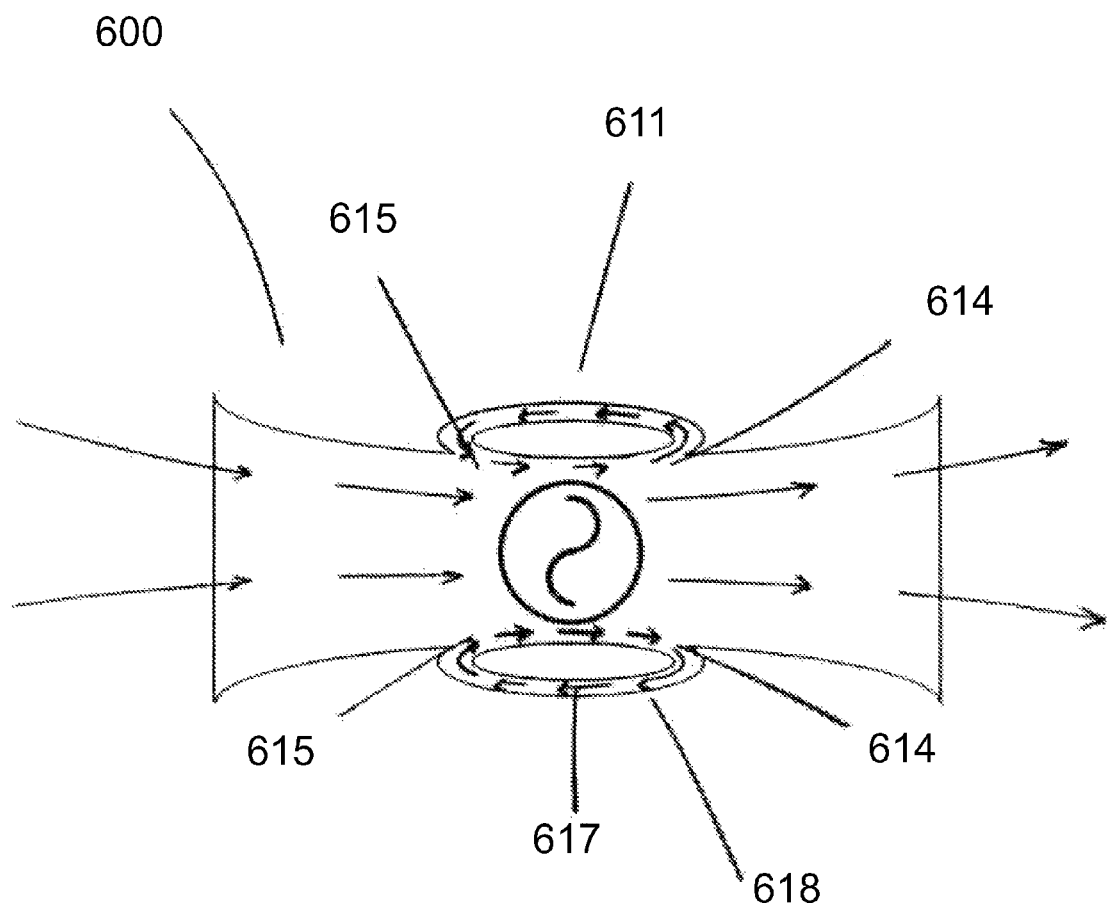
FIG. 10G is a cross sectional side view or top view of a flow guide embodiment incorporating vortexers.

FIG. 10G depicts flow guide 600 with vortexers 611 and 618 incorporating draw holes or pathways 614 and feed holes or pathways 615 which together create a bearing-like vortex to increase airflow through flow guide 600 to the turbine blades or rotor to increase the efficiency of the prime mover. The vortex action 617 could be facilitated with external power source(s) or airflow(s).

It should be understood that the flow guides listed above may increase velocity to the blade assembly, rotor, or other energy conversion device in addition to the increased velocity guided from the edge of a building or other bluff body. Therefore, the flow guides may be utilized in other locations other than on flat roofed buildings or bluff bodies. For example, they could be utilized on a wind farm in a field or on the ocean.

Figure 11A:
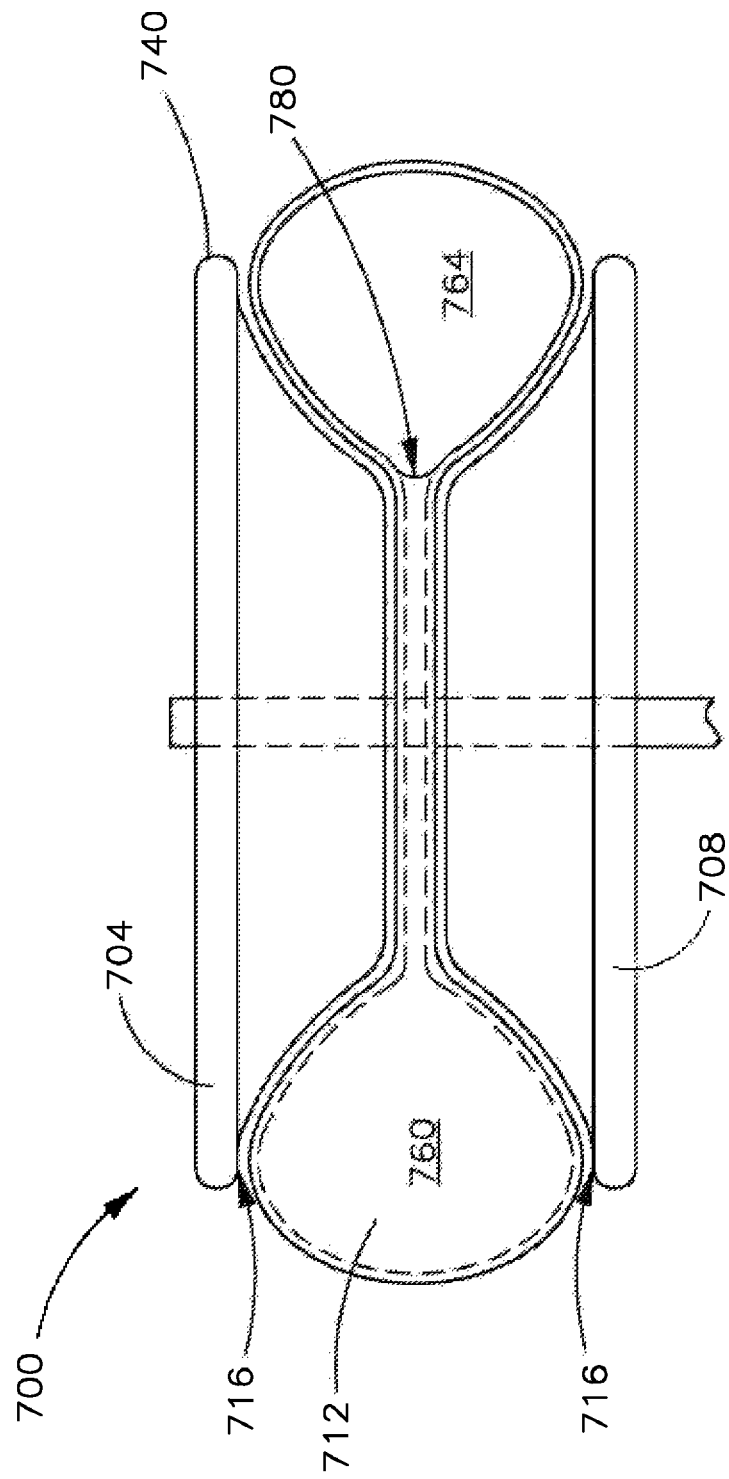
FIG. 11A is a side view of a prime mover and fairing implementation whereby the blade's fluid contact areas are disposed outside the fairings.
Figure 11B:
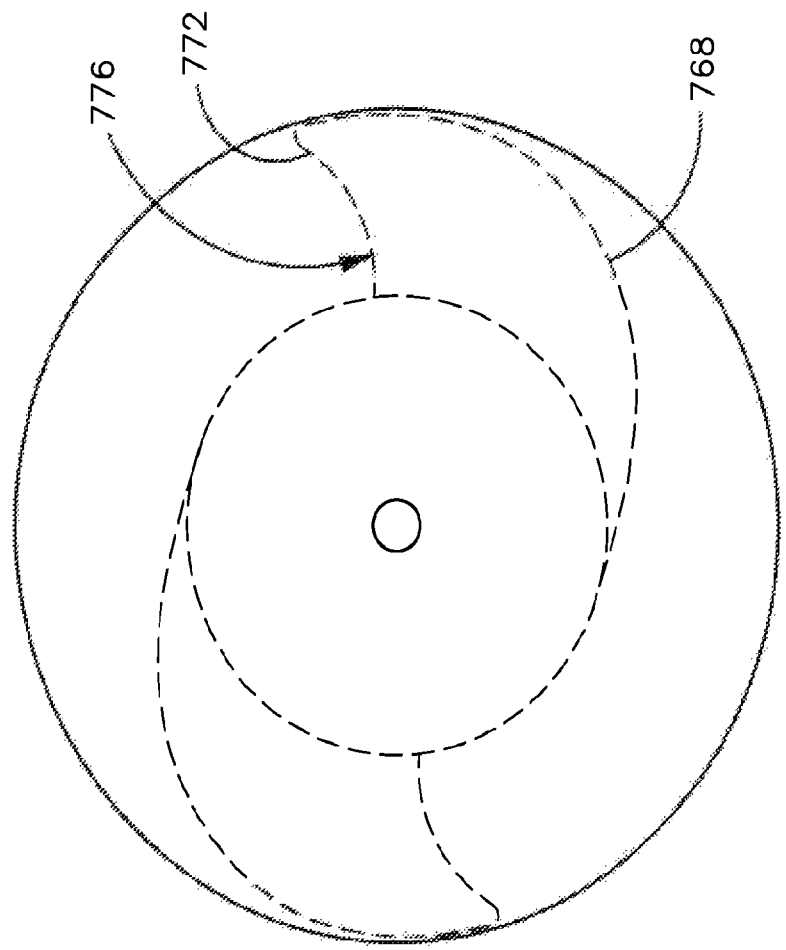
FIG. 11B is a top view of the assembly shown in FIG. 11A.

FIGS. 11A and 11B illustrate another prime mover. As shown, a prime mover 700 includes a first fairing 704 and a second fairing 708 placed closely together so that fluid flows laterally about the fairings 704 and 708 while blade assembly 712 can still rotate freely about its axis. As shown the first fairing 704 and second fairing 708 each has a peripheral surface 716 that extends over most of the blade assembly 712. In particular, an upper portion 740 of the surface 716 can extend beyond the blade assembly 712.

As shown, blade assembly 712 rotates about a vertical axis and includes a first blade 760 and a second blade 764. Each blade 760 and 764 includes a convex back face 768 and a concave front face 772 that defines a cavity 776. Front faces 772, back faces 768 and cavities 776 are similar to those described for blade assembly 70 and thus operate in a similar manner and provide the same advantages over conventional blades. Additionally blades 760 and 764 are hollow inside and provide an airflow path through 780.

Figure 12A:
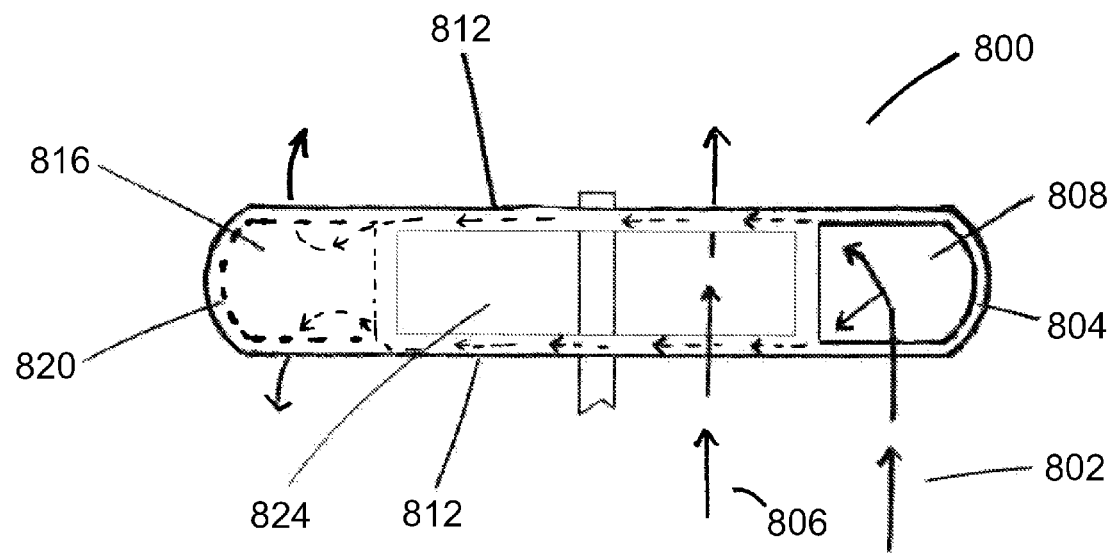
FIG. 12A is a side view of a dual channeled blade assembly.

Turbine blades and rotors are limited as to how much air can be "caught" and utilized. To increase efficiency, it is important to allow portions of flow to pass so as to "catch" the most significant components of the flow. FIG. 12A depicts a blade assembly 800 whereby airflow 802 is caught by the forward facing blade 804 through concavity 808 then travels through one or more channels 812 to be exhausted through opening 816 of the reverse facing blade 820. Upper and lower channels 812 form opening 824 that allows airflow 806 that would otherwise strike the portion of the blade furthest from the tip to pass through. This passthrough allows a higher ratio of more desirable to lesser desirable air flow components to be caught, thereby increasing the efficiency of the blade or rotor.

Figure 12B:
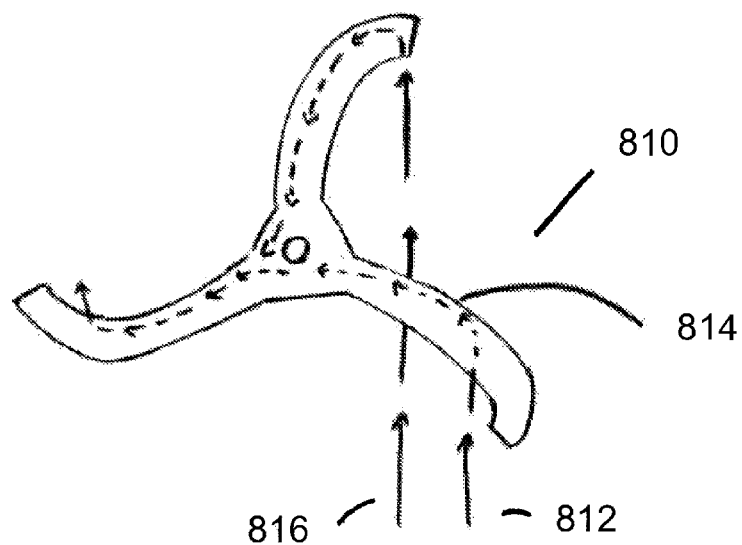
FIG. 12B is a top view of air passage through a dual channeled blade assembly.

FIG. 12B shows another blade embodiment 810 with flow component 816 passing through passageway 814 to strike the downstream blade. Also depicted are internal blade guide paths that allow flow 812 pathways to discharge fluid more effectively. The passageways 814 followed by flow 812 are oriented in such a way that incoming fluid flow will follow the desirable direction and exhaust through the return blade. The fluid flows this way as all of the forward blades, or blades impacted in their concave sections, have higher pressure from the impact of the fluid. The return blade, the blade with flow exiting its concavity, has a lower pressure. The passageway 816 within the blades allows one or more blades to exhaust through the return blade further increasing the effectiveness of the prime mover.

Figure 13A:
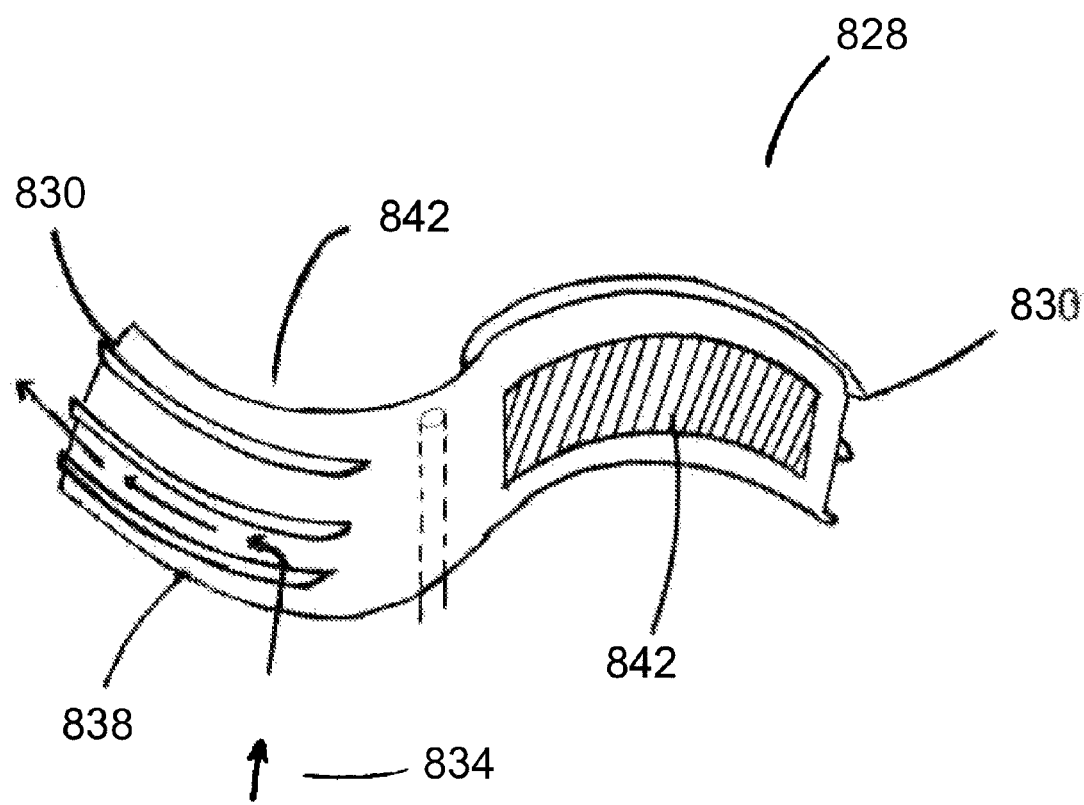
FIG. 13A is an isometric view of a blade embodiment with longitudinal fins.
Figure 13B:
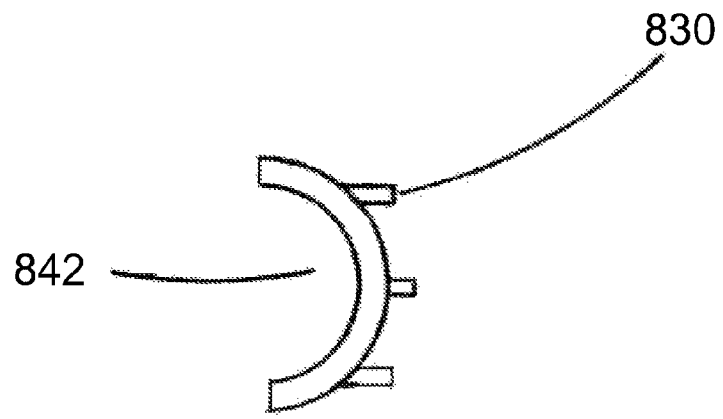
FIG. 13B is a cut-away cross section of the blade embodiment 13A.

Backwash on the returning blade, flow components from the convex side transitioning to the concave side of some turbine blades or rotors, causes an adverse pressure component. To minimize these adverse components, and to direct them instead in such a way as to increase beneficial flow components, lateral blade fins are needed. FIG. 13A and FIG. 13B together depict blade 828 utilizing a series of lateral blade fins 830 preventing flow component 834 from backwashing over the convex side 838 of the returning blade to concave side 842 instead directing the components laterally along the curved surface to increase the beneficial flow components and reduce backwash.

The description of prime movers, blades, flow guides, and their respective subsystems are for illustration purposes, and the present invention is not intended to the particular descriptions or uses provided herein, nor is the designation of parts into particular subsystems intended to limit the scope of the invention in any way, except for the particular structure that is explicitly recited in the claim. For example, prime movers 10 and 700 may also be used to generate heat power, circulate liquids, separate hydrogen from water to use or store for energy and other energy power usages. Also, it will be appreciated that multiple blade assemblies, turbines, rotors, or other energy conversion devices may be utilized on the fairings or within the flow guide or passageways. It also should be understood that multiple blade assemblies, turbines, rotors, or other energy conversion devices may be arranged in such a way that their efficiency is increased because of their respective positions with respect to each other while mounted on the fairings or within the flow guide or passageways. It should also be understood that some or all of the surfaces of any of the fairings, blades, or flow guides could be smooth or aerodynamically textured in such a way that one skilled in the art would use to increase fluid flows and efficiency. For example the texture could be that of a golf ball or shark skin whereby the "divots" create ball bearing like vortices that reduce surface friction and facilitate fluid flow to increase efficiencies.

What is claimed:

1. A prime mover powered by the energy of a fluid, the prime mover comprising:
   a blade assembly, turbine, or rotor adapted to convert fluid flow into energy; and
   a fairing adapted to guide a fluid to the blade assembly, turbine, or rotor, the fairing having a curved peripheral edge that transitions smoothly into a substantially flat surface, and the curved peripheral edge being connected to the flat surface outside an area where the blade assembly, turbine, or rotor rotates to form a continuous smooth surface providing a continuous smooth path for fluid flow to follow to said area where the blade assembly, turbine, or rotor rotates and is impacted by the guided fluid, whereby fluid flow impacts said blade assembly, turbine, or rotor to convert the fluid flow to energy, said continuous smooth surface continuing through said area where the blade assembly, turbine, or rotor rotates through to an exit of the blade assembly, turbine, or rotor wherein said fairing has slots or pathways into the fairing that reduce and/or redirect the fluid flow away from the area where the blade assembly, turbine, or rotor rotates to thereby avoid impacting a return section of the blade assembly or rotor and/or to reduce static pressure along a fairing edge furthest from an area of blade rotation.

2. The prime mover of claim 1, further comprising one or more additional fairings spaced apart from the fairing to define a gap therebetween, said fairings each having a curved peripheral edge for guiding a fluid into the gap; the peripheral edge of each fairing transitioning smoothly into a substantially flat continuous surface throughout the area where the blade assembly, turbine, or rotor is impacted by the guided fluid to convert the fluid flow to energy.

3. The prime mover of claim 2, wherein the blade assembly and the fairing fit into an inverted hollow section of the one or more additional fairings.

4. The prime mover of claim 2, wherein the fairing has a first diameter, the one or more additional fairings have a second diameter, and the first diameter is smaller than the second diameter.

5. The prime mover of claim 2, wherein the peripheral edge of each fairing is shaped to direct fluid flow inward toward an area whereby the blade assembly, turbine, or rotor are put into motion by the fluid.

6. The prime mover of claim 2, wherein the height of at least one of the fairings is at least 20% of the height of the gap.

7. The prime mover of claim 2, wherein the height of at least one of the fairings is at least 30% of the height of the gap.

8. The prime mover of claim 2, wherein one fairing comprises a surface of a water tower on which the prime mover is mounted.

9. The prime mover of claim 1, further comprising one or more guide sections that redirect the fluid flow components through the slots to other areas, said one or more guide sections being incorporated within the fairing.

10. The prime mover of claim 1, wherein the blade assembly comprises at least one blade.

11. The prime mover of claim 10, wherein the blade is curved and has a front face and a back face, the front face is concave and the back face is convex, and the front face defines a cavity for catching the fluid.

12. The prime mover of claim 11, wherein the curved blade is hollowed to make one or more passageways to allow fluid flow to be exhausted to one or more additional blades.

13. The prime mover of claim 11, wherein the back face has a curved shape that is adapted to guide the fluid.

14. The prime mover of claim 11, wherein the curved blade further includes a tip that curves into the fluid.

15. The prime mover of claim 11, wherein the blade assembly further comprises an arm that extends from the shaft, and the curved blade is attached to a distal end of the arm.

16. The prime mover of claim 15, wherein the arm is curved, and the curved arm includes a concave side and a convex side.

17. The prime mover of claim 11, wherein the curved blade catches fluid flow in a concavity therein, proximate to a tip of the curved blade, which leads into channels that direct the caught flow to an area between the concavity and an axis about which the curved blade rotates, and ultimately exhausts the fluid flow through the return blade, so as to allow uncaught ambient flow to pass through the space outlined by the channels.

18. The prime mover of claim 11, wherein one or more longitudinal fins protrude from the convex side of the curved blade.

19. The prime mover of claim 1, wherein the blade assembly comprises a flywheel and a plurality of curved blades extending from a peripheral surface of the flywheel.

20. The prime mover of claim 1, wherein the blade assembly comprises a flywheel and plurality of curved blades incorporated within the flywheel.

21. The prime mover of claim 1, wherein the fluid is air.

22. The prime mover of claim 1, wherein the fairing and blade assembly are connected together to rotate as a single unit about a vertical axis.

23. The prime mover of claim 1, wherein the fairing is circular in shape.

24. The prime mover of claim 1 wherein the peripheral edge of the fairing is parabolic or straight.

25. The prime mover of claim 1, wherein a plurality of guide vanes are disposed on the peripheral edges of the fairing.

26. The prime mover of claim 1, wherein the peripheral edge is circular.

27. The prime mover of claim 1, wherein multiple blade assemblies, turbines, or rotors operate on the fairing.

28. The prime mover of claim 27, wherein the multiple blade assemblies, turbines, or rotors are arranged in such a way that the efficiency of the prime mover is increased because of the respective positions of the blade assemblies, turbines, or rotors with respect to each other.

29. The prime mover of claim 1, wherein the fairing acts as a protective covering for operational items and equipment contained therein.

30. The prime mover of claim 1, wherein the fairings and/or blades are aerodynamically textured with divots like a golf ball.

31. A prime mover powered by the energy of air, the prime mover comprising a blade assembly, turbine, or rotor adapted to convert airflow into energy, and a continuous smooth curved planar surface that guides airflow to said blade assembly, turbine, or rotor, that extends from a position proximate to an edge of a building or bluff body, and that creates a continuous smooth path for airflow to flow over, said path being substantially curved-convex up to form a Coanda effect at an inlet to draw in airflow of increased velocity that exists near the edge of the building or bluff body, said planar surface providing a continuous smooth path for the airflow of increased velocity to follow through the area where the blade assembly, turbine, or rotor rotates and is impacted by the guided airflow, whereby airflow impacts said blade assembly, turbine, or rotor to convert the airflow to energy, said continuous smooth surface continuing through said area where the blade assembly, turbine, or rotor rotates through to an exit of the blade assembly, turbine, or rotor.

32. The prime mover of claim 31, wherein the surface is further adapted to form with at least one other surface, which is substantially parallel to said curved planar surface to form a flow guide, a partially enclosed passageway, or fully enclosed passageway to guide airflow of increased velocity through an entirety of the area within said flow guide containing the blade assembly, turbine, or rotor to rotate or otherwise cause motion of said blade assembly, turbine, or rotor.

33. The prime mover of claim 32, wherein the curved planar surface and said at least one other surface are both curved in a same direction at an inlet toward a surface of the building or bluff body wherein the flow guide or passageway encloses a space that has a cross-sectional area that decreases towards an end in which the blade assembly, turbine, or rotor is placed such that the air flow velocity is increased, above that of the entrance velocity to the flow guide or passageway, to the entirety of the area containing the blade assembly, turbine, or rotor.

34. The prime mover of claim 32, wherein one or more sides of an inlet and/or outlet of the flow guide or passageway are curved to accept/discharge airflow from a wider range of directions.

35. The prime mover of claim 32, wherein the flow guide or passageway includes means for preventing objects from exiting an opening in the flow guide or passageway and/or guiding flow around obstacles on the building.

36. The prime mover of claim 32, wherein the blade assembly or rotor has a characteristic swept surface area that is substantially cylindrical.

37. The prime mover of claim 32, wherein multiple blade assemblies, turbines, or rotors operate on or within the flow guide or passageway.

38. The prime mover of claim 37, whereby the multiple blade assemblies, turbines, or rotors are arranged on the surface or within the flow guide or passageway in such a way that the efficiency of the prime mover is increased because of the respective positions of the blade assemblies, turbines, or rotors with respect to each other.

39. The prime mover of claim 32, wherein the flow guide or passageway exit is shaped to reconnect an exit flow with an ambient air stream.

40. The prime mover of claim 32, further comprising an external structure aft of an exit of the flow guide or passageway to reconnect exit flow with an ambient air stream.

41. The prime mover of claim 32, further comprising means for slowing or stopping the blade assemblies, turbines, or rotors.

42. The prime mover of claim 41, whereby the means for slowing or stopping the blade assemblies, turbines, or rotors comprises one or more flaps in the flow guide or passageway.

43. The prime mover of claim 32, wherein the turbine blades or rotor rotate about a horizontal axis oriented parallel to a top edge of the building or bluff body or to the surface of the flow guide or passageway.

44. The prime mover of claim 32, wherein at least one pair of opposing edges of the flow guide or passageway curve or angle in the same direction and or curve in the direction to or from which the fluid will flow.

45. The prime mover of claim 32, wherein the flow guide or passageway and/or blades are aerodynamically textured.

46. A prime mover powered by the energy of a fluid, the prime mover comprising a blade assembly, turbine, or rotor adapted to convert fluid flow into energy, and a surface adapted to guide fluid flow of increased velocity to an entirety of the area containing the blade assembly, turbine, or rotor to rotate or otherwise cause motion of said blade assembly, turbine, or rotor, wherein the surface is further adapted to form a flow guide, a partially enclosed passageway, or fully enclosed passageway to guide fluid flow of increased velocity to an entirety of the area within said flow guide containing the blade assembly, turbine, or rotor to rotate or otherwise cause motion of said blade assembly, turbine, or rotor, wherein at least one path feeds fluid flow back into the flow guide or passageway from within the flow guide or passageway or feeds fluid flow in from an external location.

47. The prime mover of claim 46, wherein an external airflow path, enclosed or open air, is formed outside the flow guide or passageway that is adapted to introduce air back into the flow guide or passageway, to facilitate flow, or to help draw flow through the prime mover.

48. The prime mover of claim 46, wherein the flow guide or passageway further includes vortexers incorporating draw holes or first pathways and feed holes or second pathways that together create a bearing-like vortex to increase fluid flow through the flow guide or passageway to the blade assembly, turbine, or rotor to increase the efficiency of the prime mover.

49. A prime mover powered by the energy of a fluid, the prime mover comprising:
 a blade assembly, turbine, or rotor adapted to convert fluid flow into energy; and
 floating fairings spaced apart from each other to define a gap therebetween and adapted to guide a fluid to the blade assembly, turbine, or rotor, each fairing having a curved peripheral edge that transitions smoothly into a substantially flat surface, and the curved peripheral edge being connected to the flat surface outside an area where the blade assembly, turbine, or rotor rotates to form a continuous smooth surface providing a continuous smooth path for airflow to follow to said area where the blade assembly, turbine, or rotor rotates and is impacted by the guided fluid, whereby airflow impacts said blade assembly, turbine, or rotor to convert the fluid flow to energy, said continuous smooth surface continuing through said area where the blade assembly, turbine, or rotor rotates through to an exit of the blade assembly, turbine, or rotor, further comprising vanes adapted to slow or stop rotation of the fairings while the blade assembly, turbine, or rotor is rotated while floating in water.

* * * * *